(12) United States Patent
Goertzen et al.

(10) Patent No.: US 8,833,774 B2
(45) Date of Patent: Sep. 16, 2014

(54) SUSPENSION FOR WHEELED VEHICLES

(71) Applicant: Invacare Corporation, Elyria, OH (US)

(72) Inventors: Gerold Goertzen, Brunswick, OH (US); William A. Null, Sullivan, OH (US); Robert L. Cuson, Lagrange, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 13/970,794

(22) Filed: Aug. 20, 2013

(65) Prior Publication Data
US 2013/0334778 A1 Dec. 19, 2013

Related U.S. Application Data

(60) Division of application No. 11/472,509, filed on Jun. 20, 2006, now Pat. No. 8,534,679, which is a continuation-in-part of application No. 10/695,045, filed on Oct. 27, 2003, now Pat. No. 7,083,195, which is a continuation-in-part of application No. 10/643,010, filed on Aug. 18, 2003, now Pat. No. 6,851,711, said application No. 11/472,509 is a continuation of application No. 11/077,483, filed on Mar. 10, 2005, now Pat. No. 7,293,801, which is a continuation-in-part of application No. 10/695,045, filed on Oct. 27, 2003, now Pat. No. 7,083,195, which is a continuation-in-part of application No. 10/643,010, filed on Aug. 18, 2003, now Pat. No. 6,851,711.

(60) Provisional application No. 60/421,178, filed on Oct. 25, 2002.

(51) Int. Cl.
*A61G 5/04* (2013.01)
*A61G 5/06* (2006.01)
*B60G 15/08* (2006.01)
*B60G 17/005* (2006.01)
*B62D 61/10* (2006.01)
*A61G 5/10* (2006.01)

(52) U.S. Cl.
CPC ........ *B60G 15/08* (2013.01); *B60G 2204/4605* (2013.01); *B60G 17/005* (2013.01); *A61G 2203/14* (2013.01); *B60G 2204/4604* (2013.01); *A61G 2203/32* (2013.01); *A61G 5/101* (2013.01); *B60G 2300/24* (2013.01); *A61G 2005/1078* (2013.01); *A61G 5/1032* (2013.01); *A61G 5/043* (2013.01); *A61G 5/06* (2013.01); *A61G 2005/1089* (2013.01); *Y10S 180/907* (2013.01)
USPC ................ 280/5.513; 280/124.104; 280/755; 180/907; 180/65.1

(58) Field of Classification Search
USPC ...................... 280/5.513, 124.104, 755, 754; 180/65.1, 907
See application file for complete search history.

(56) References Cited

U.S. PATENT DOCUMENTS 5,098,114 A * 3/1992 Jones ........................... 280/284
5,123,495 A * 6/1992 Littlejohn et al. ........... 180/9.32

(Continued)

*Primary Examiner* — Paul N Dickson
*Assistant Examiner* — George Spisich
(74) *Attorney, Agent, or Firm* — Calfee, Halter & Griswold LLP

(57) ABSTRACT

A wheelchair suspension comprises a frame, at least one pivot arm, at least one front caster, at least one rear caster, a stabilizing system, and a sensor. The pivot arm is coupled to the frame. The front caster is coupled to the pivot arm. The rear caster is coupled to the frame. The stabilizing system is coupled to the frame and the pivot arm. The sensor is arranged such that tipping of the frame causes actuation of the stabilizing system to at least partially resist further movement of the frame.

20 Claims, 32 Drawing Sheets

(56) References Cited

U.S. PATENT DOCUMENTS

| | | | |
|---|---|---|---|
| 5,435,404 A * | 7/1995 | Garin, III | 180/6.5 |
| 5,848,658 A * | 12/1998 | Pulver | 180/65.1 |
| 5,964,473 A * | 10/1999 | Degonda et al. | 280/250.1 |
| 6,079,725 A * | 6/2000 | Lazaros | 280/250.1 |
| 6,129,165 A * | 10/2000 | Schaffner et al. | 180/65.1 |
| 6,375,209 B1 * | 4/2002 | Schlangen | 280/250.1 |
| 6,460,641 B1 * | 10/2002 | Kral | 180/24.02 |
| 6,533,306 B2 * | 3/2003 | Watkins | 280/304.1 |
| 6,543,798 B2 * | 4/2003 | Schaffner et al. | 280/250.1 |
| 6,601,863 B1 * | 8/2003 | Mentessi et al. | 280/304.1 |
| 2002/0180166 A1* | 12/2002 | Voss | 280/5.5 |
| 2004/0084230 A1* | 5/2004 | Grymko et al. | 180/65.1 |
| 2004/0262859 A1* | 12/2004 | Turturiello et al. | 280/5.515 |
| 2005/0206149 A1* | 9/2005 | Mulhern et al. | 280/755 |
| 2010/0004820 A1* | 1/2010 | Bekoscke et al. | 701/38 |

* cited by examiner

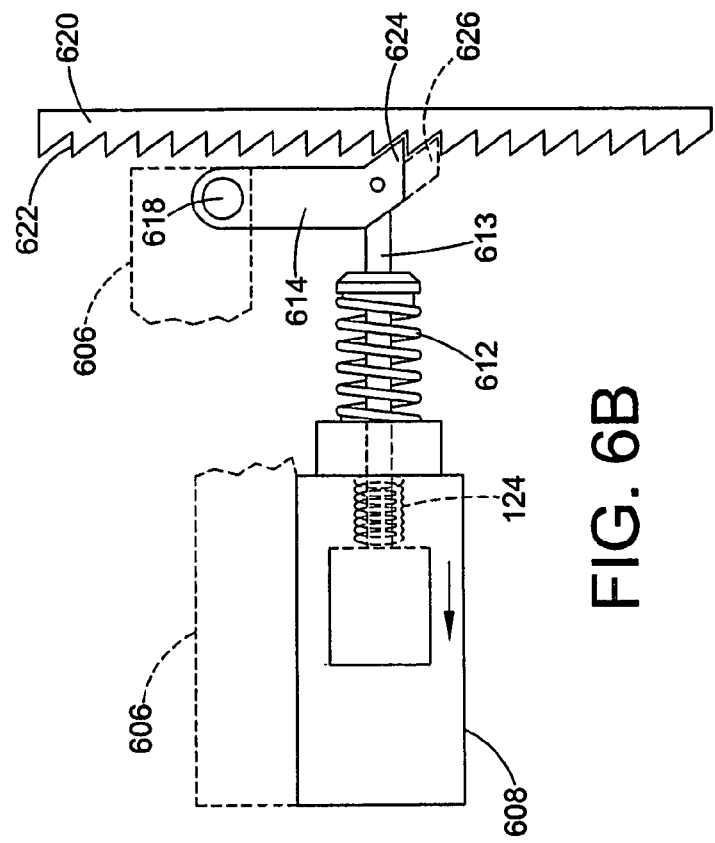
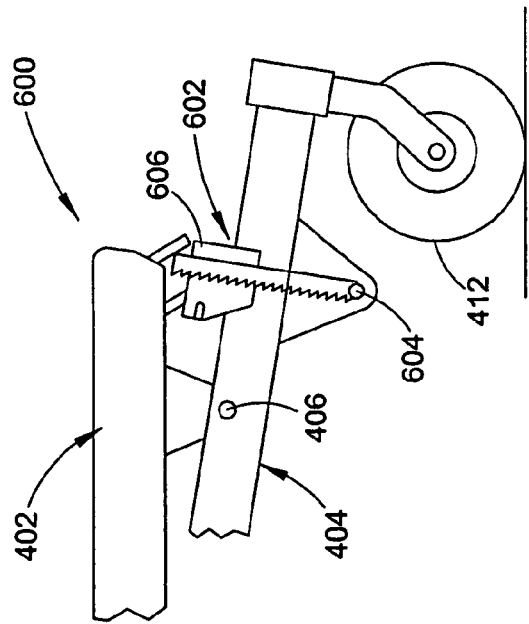
FIG. 6B
FIG. 6A

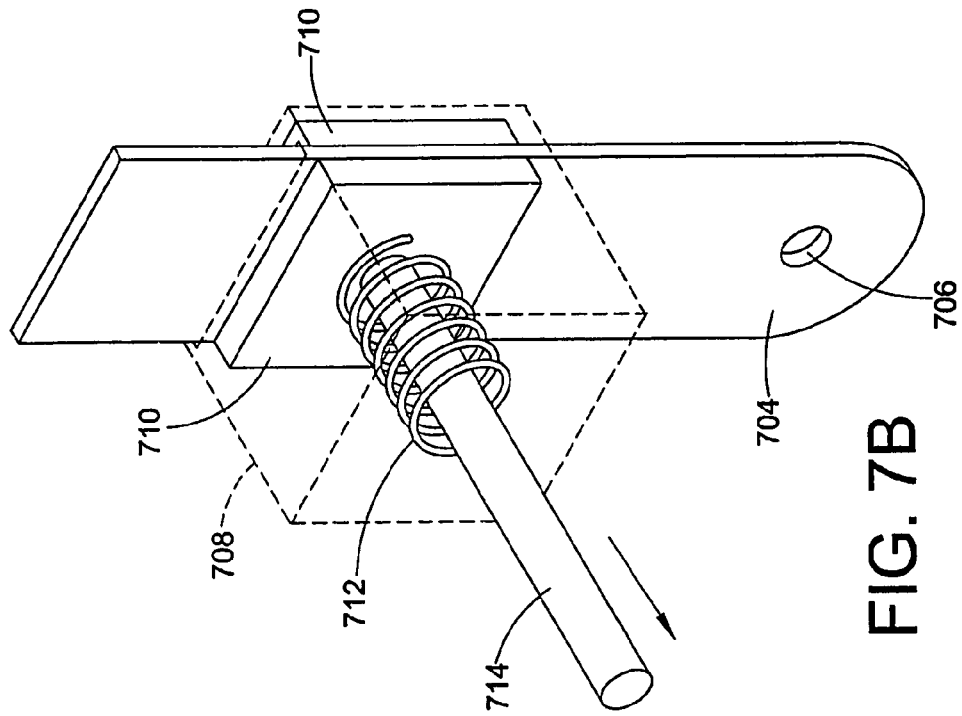
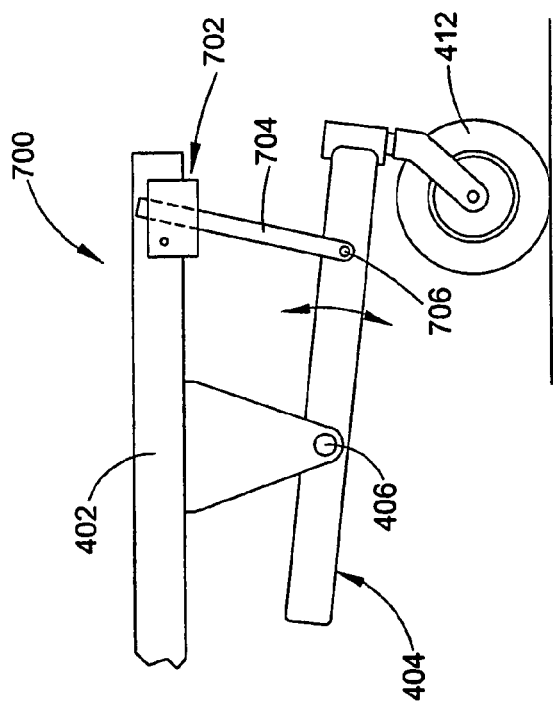
FIG. 7B
FIG. 7A

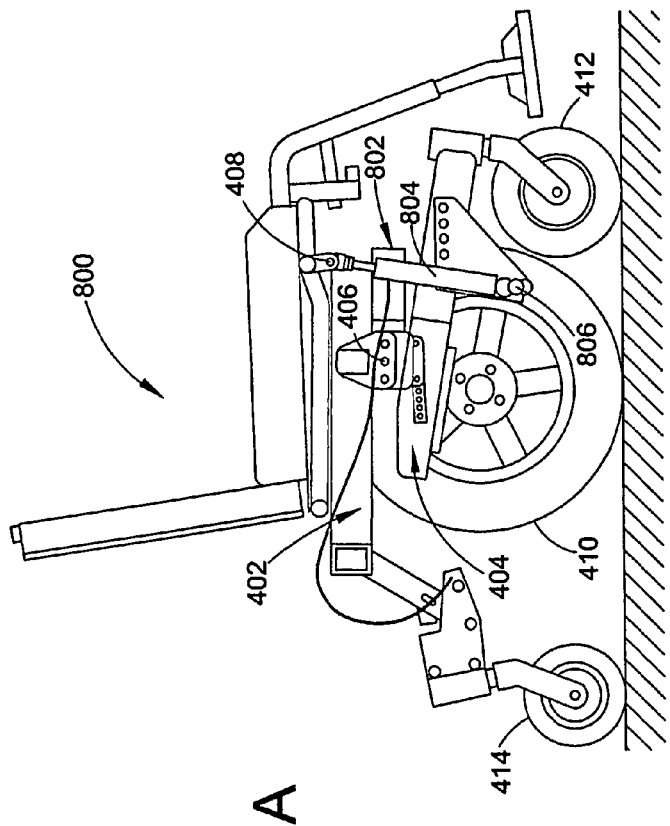
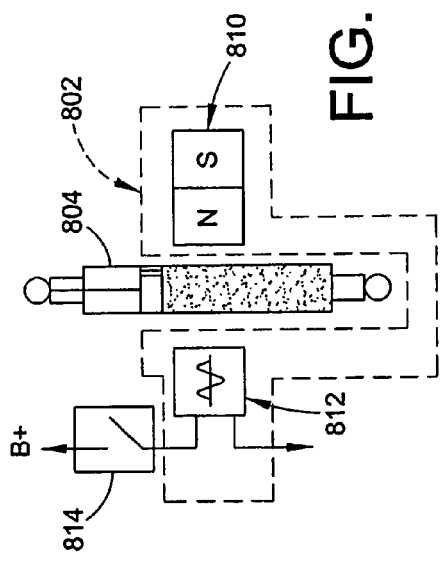
FIG. 8C
FIG. 8A
FIG. 8B

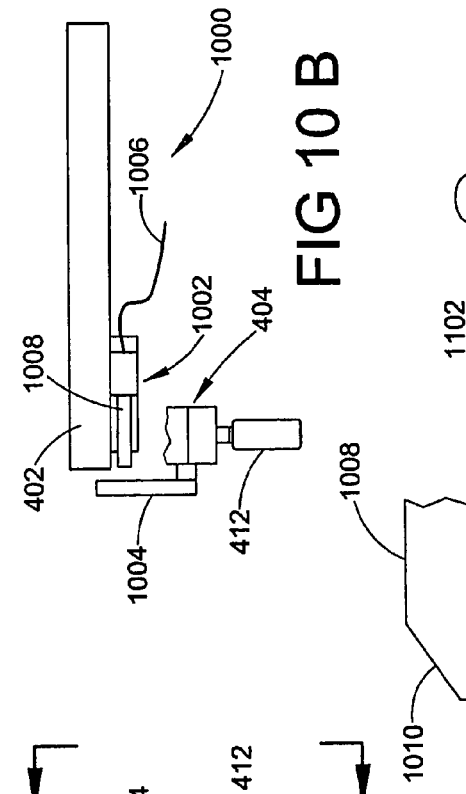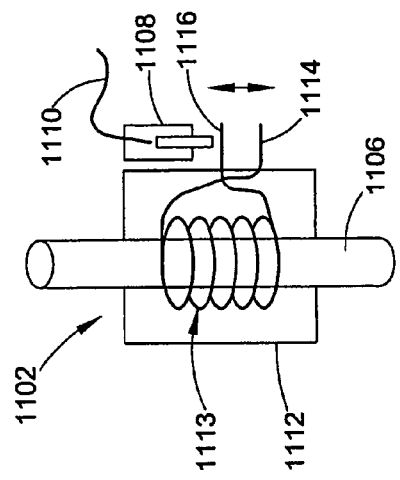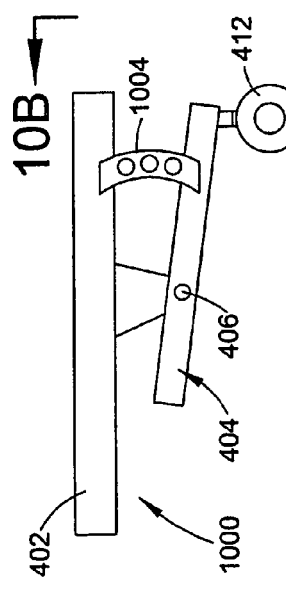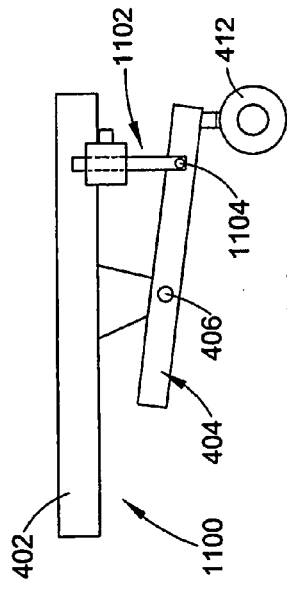

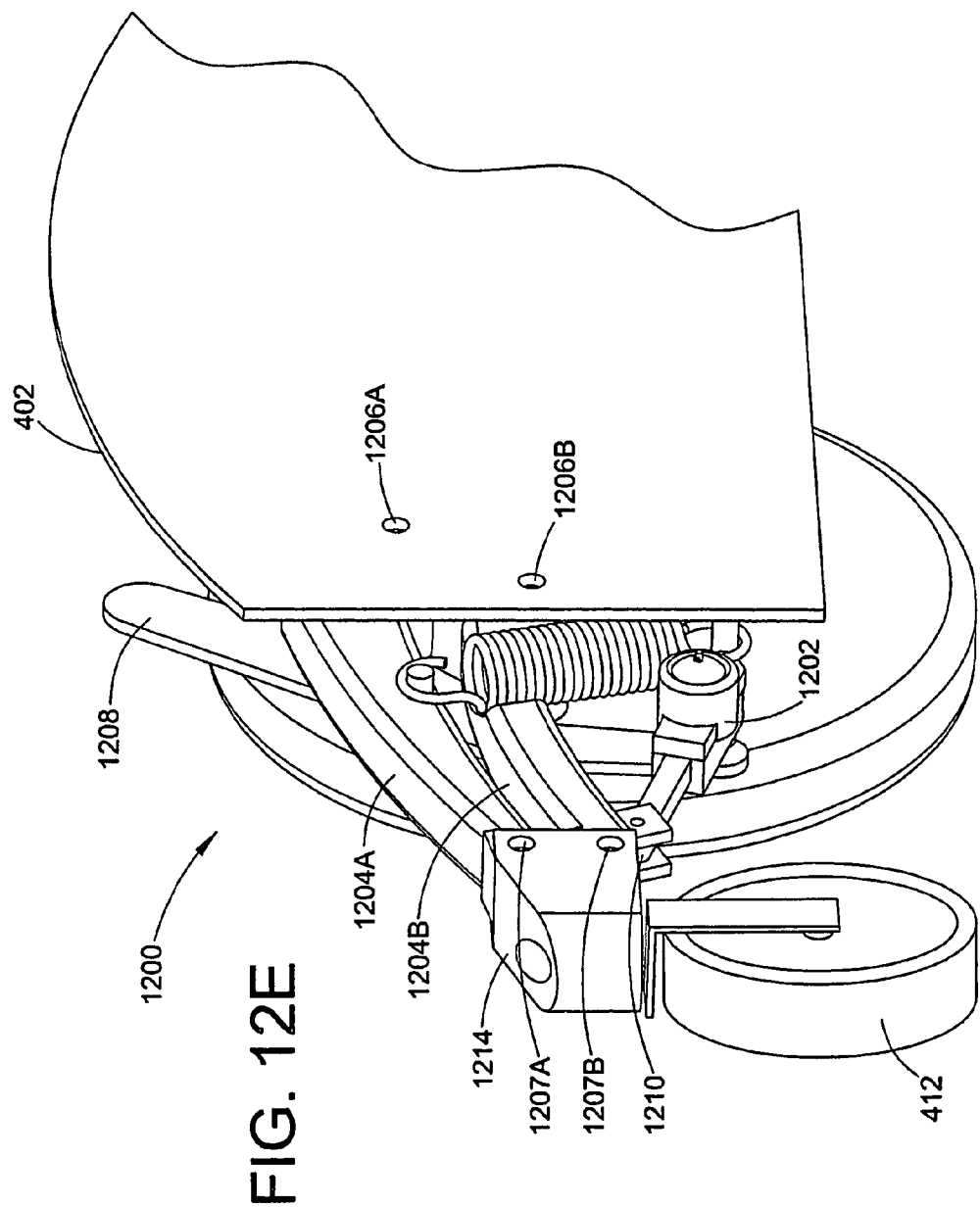

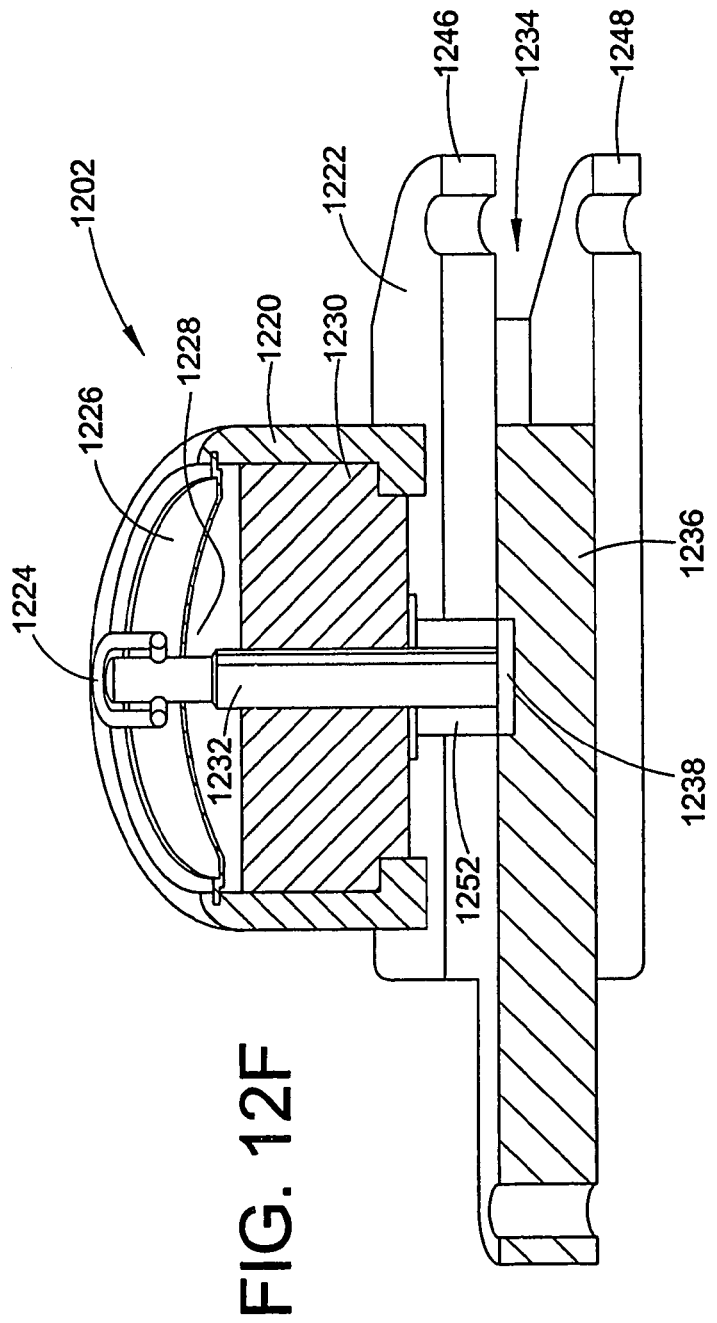

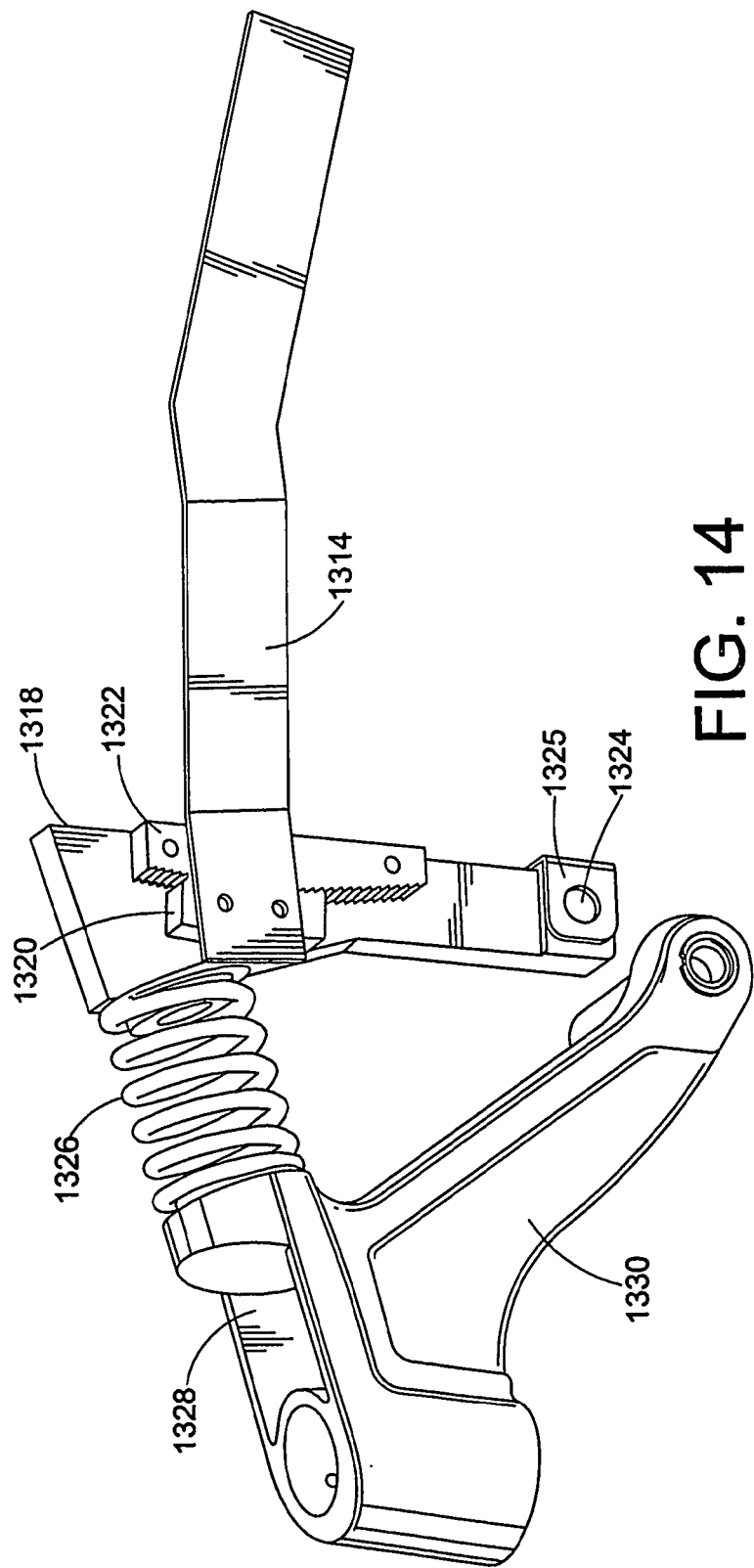

SUSPENSION FOR WHEELED VEHICLES

CROSS-REFERENCES TO RELATED APPLICATIONS

This patent application is a divisional application of and claims priority from U.S. application Ser. No. 11/472,509, entitled "Suspension for Wheeled Vehicles," which is a continuation-in-part of U.S. application Ser. No. 10/695,045, now U.S. Pat. No. 7,083,195, entitled "Suspension with Releasable Locking System" filed on Oct. 27, 2003, which is a continuation-in-part of U.S. application Ser. No. 10/643,010, now U.S. Pat. No. 6,851,711, entitled "Vehicle Having an Anti-Dive/Lockout Mechanism" filed on Aug. 18, 2003, which claims the benefit of U.S. Provisional Application Ser. No. 60/421,178 filed on Oct. 25, 2002. Patent application Ser. No. 11/472,509 is also a continuation of U.S. application Ser. No. 11/077,483, entitled "Self-Stabilizing Suspension for Wheeled Vehicles" filed on Mar. 10, 2005, now U.S. Pat. No. 7,293,801. The entire disclosures of the U.S. application Ser. No. 11/472,509 and U.S. Pat. Nos. 7,293,801; 7,083,195 and 6,851,711 are incorporated by reference in their entirety.

FIELD OF THE INVENTION

The invention relates generally to conveyances and, more particularly, to motorized conveyances (vehicles) such as wheelchairs and scooters.

BACKGROUND OF THE INVENTION

Wheelchairs and scooters are an important means of transportation for a significant portion of society. Whether manual or powered, these vehicles provide an important degree of independence for those they assist. However, this degree of independence can be limited if the wheelchair is required to traverse obstacles such as, for example, curbs that are commonly present at sidewalks, driveways, and other paved surface interfaces. This degree of independence can also be limited if the vehicle is required to ascend inclines or descend declines.

In this regard, most wheelchairs have front and rear casters to stabilize the chair from tipping forward or backward and to ensure that the drive wheels are always in contact with the ground. One such wheelchair is disclosed in U.S. Pat. No. 5,435,404 to Garin. On such wheelchairs, the caster wheels are typically much smaller than the driving wheels and located both forward and rearward of the drive wheels. Though this configuration provides the wheelchair with greater stability, it can hamper the wheelchair's ability to climb over obstacles such as, for example, curbs or the like, because the front casters could not be driven over the obstacle due to their small size and constant contact with the ground.

U.S. Pat. No. 6,196,343 to Strautnieks also describes a wheelchair having front and rear casters. The front casters are each connected to a pivot arm that is pivotally attached to the sides of the wheelchair frame. Springs bias each pivot arm to limit the vertical movement thereof. So constructed, each front caster can undergo vertical movement when running over an obstacle.

While the above-mentioned art provides various ways of addressing the need for stabilizing mid-wheel drive vehicles, a need for further stabilization exists. For example, though equipped with front and rear suspended casters, most mid-wheel drive wheelchairs exhibit various degrees of tipping forward or rearward when descending declines or ascending inclines. This is because the suspensions suspending the front or rear stabilizing casters are compromised so that they are not made too rigid, which would prevent tipping and also not provide much suspension or are made too flexible thereby effectively not providing any degree of suspension or stabilization. Hence, a need exists for addressing the tipping or "diving" experienced by most mid-wheel drive vehicles that have suspension systems included with their stabilization mechanisms.

SUMMARY OF THE INVENTION

An embodiment of a wheelchair suspension comprises a frame, at least one pivot arm, at least one front caster, at least one rear caster, a stabilizing system, and a sensor. The pivot arm is coupled to the frame. The front caster is coupled to the pivot arm. The rear caster is coupled to the frame. The stabilizing system is coupled to the frame and the pivot arm. The sensor is arranged such that tipping of the frame causes actuation of the stabilizing system to at least partially resist further movement of the frame.

BRIEF DESCRIPTION OF THE DRAWINGS

In the accompanying drawings which are incorporated in and constitute a part of the specification, embodiments of the invention are illustrated, which together with a general description of the invention given above and the detailed description given below, serve to example the principles of this invention.

FIGS. 6A and 6B illustrate a first embodiment of a locking member or assembly.

FIGS. 7A and 7B illustrate a second embodiment of a locking member or assembly.

FIGS. 8A, 8B, and 8C illustrate a third embodiment of a locking member or assembly.

FIGS. 10A, 10B, and 10C illustrate a fifth embodiment of a locking member or assembly.

FIGS. 11A and 11B illustrate a sixth embodiment of a locking member or assembly.

FIGS. 13-18B illustrate an eighth embodiment of a locking member or assembly.

DETAILED DESCRIPTION OF ILLUSTRATED EMBODIMENT

Generally, a mid-wheel drive wheelchair or scooter is a vehicle used to assist those having an impaired ability to transport themselves. As such, the mid-wheel drive wheelchairs and scooters of the present invention have at least two drive wheels that are positioned approximately below the center of gravity of the vehicle when loaded with a user. This results in a majority of the total wheelchair or scooter weight being on the two drive wheels. Mid-wheel drive wheelchairs and scooters also include one or more casters for forward and rearward stability, respectively positioned forward and rearward of the drive wheels. One example of a mid-wheel drive wheelchair can be found in U.S. Pat. No. 5,435,404 to Garin, which is hereby fully incorporated by reference.

At least one motor or combination motor/gear box is provided to drive the drive wheels. The motor is typically controlled by an electronic controller connected to one or more user control devices. The user control devices generally provide selection of forward and reverse movement of the vehicle, as well as controlling the velocity or speed. A battery typically supplies the controller and drive motors with an energy supply. Dynamic braking and an automatic park brake are also incorporated into the vehicle. The dynamic brake allows the operator to proceed safely, even down a slope, without worrying that the vehicle will unreasonably increase in speed while going down the slope. Further, the park brake automatically engages to hold the vehicle in place when the vehicle is standing still.

The present invention provides multiple embodiments of a stabilization system that provides mid-wheel drive vehicles with an anti-dive or lock out mechanism. Generally, the stabilization system includes a trigger or sensor for sensing when conditions exist that may cause the mid-wheel drive vehicle to exhibit a tipping behavior, which can be either forward or rearward, and a locking member or assembly that locks the suspension system to prevent any further tipping behavior. The trigger or sensor also senses when the mid-wheel drive vehicle is no longer subject to conditions that may cause it to exhibit a tipping behavior and causes the locking member or assembly to no longer lock the suspension system.

Figure 1:
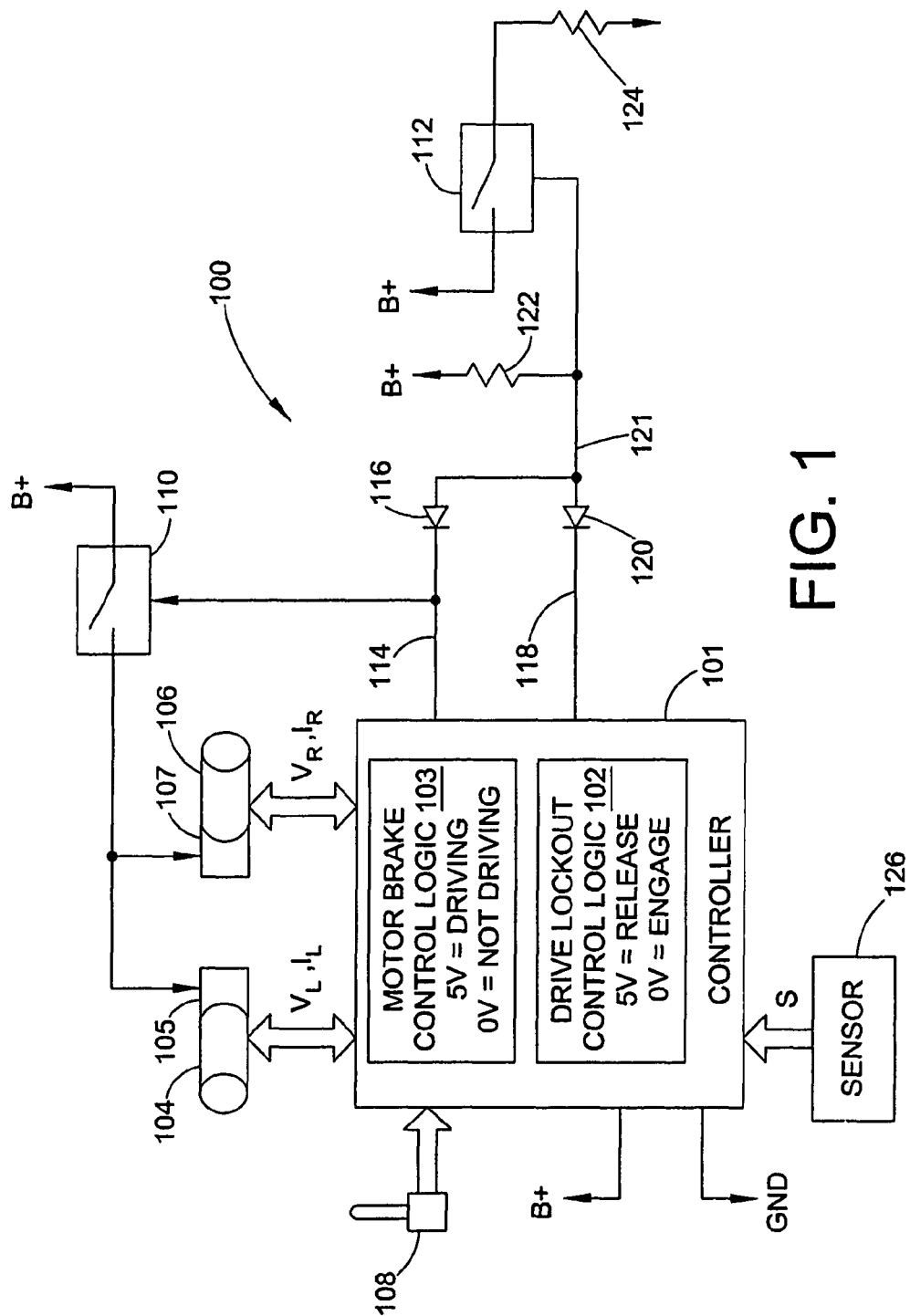
FIG. 1 is a block diagram of a first embodiment of an electronic-based stabilization system.
Figure 4:
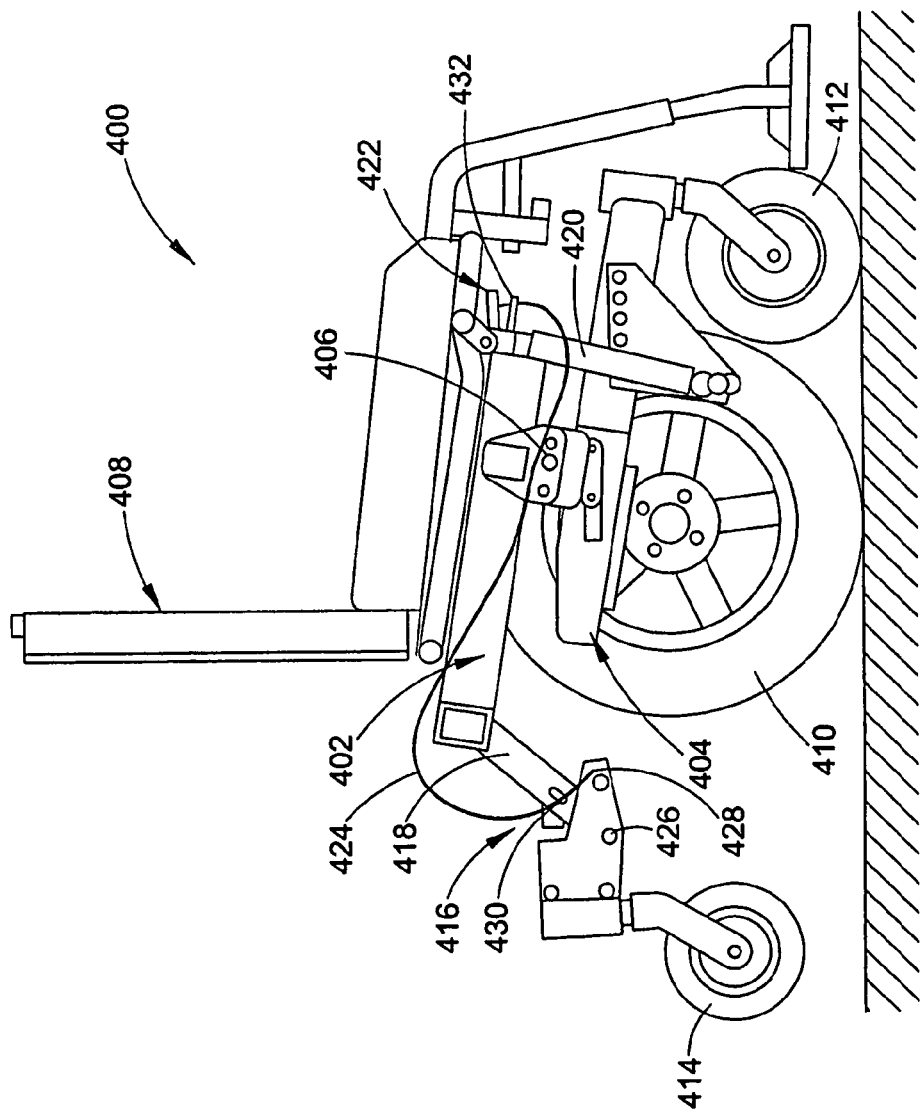
FIG. 4 is a side elevation overview of a first embodiment of a mechanically-based stabilization system.
Figure 5:
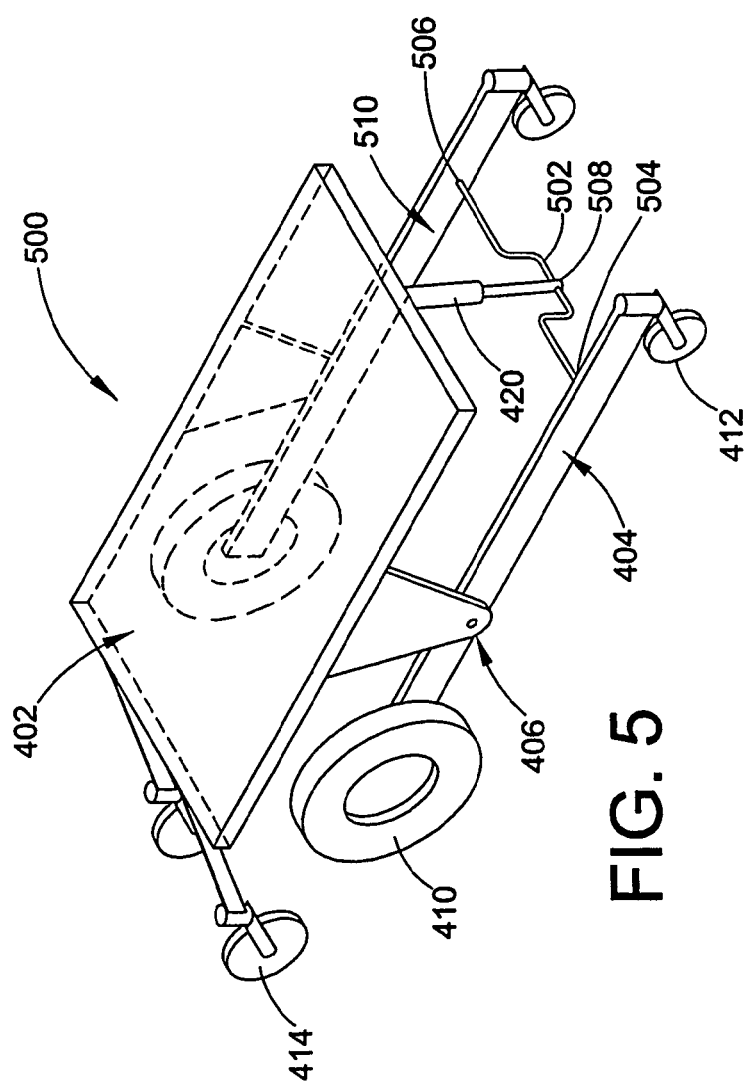
FIG. 5 is a partial perspective view of a second embodiment of a mechanically-based stabilization system.

Referring now to FIGS. 1 and 4, a block diagram of a first embodiment 100 of an electronic-based stabilization system is shown and a representative mid-wheel drive wheelchair is shown, respectively. Referring more specifically to FIG. 4, the mid-wheel drive wheelchair has a frame 402 and pivot arm 404. A pivotal connection 406 connects frame 402 and pivot arm 404. Attached to pivot arm 404 is a drive wheel 410. This attachment is typically provided through a motor or motor/gear box that is attached to pivot arm 404. Pivot arm 404 further has a front caster 412 attached to a forward portion thereof, while the motor or motor/gear box is attached to a more distal opposite portion. Mounting brackets and/or apertures are provided in pivot arm 404 for connecting pivot arm 404 to frame 402 via pivotal connection 406. A rear caster assembly 416 is provided that includes a frame member 418 and caster 414. A second pivot arm and assembly is similarly provided on the opposite of the wheelchair, as shown in FIG. 5.

Referring now to FIG. 1, the stabilization system triggers a locking member or assembly whenever the summation of moments or torque about pivotal connection 406 exceeds a pre-loaded value or, in other words, causes the frame 402 of the wheelchair to tip forward. One of the moment arms that influences this loading is the moment arm defined by the distance from the center of gravity Cg of the mass of the wheelchair occupant and seat 408 to pivotal connection 406. The torque or moment acting on the center of gravity Cg is generally defined by: (mass of the wheelchair occupant and seat).times.[(wheelchair acceleration)+(sine of the slope angle).times.(acceleration of gravity)]. The slope angle is the slope of the angle measured from a horizontal. For example, if the wheelchair is traveling on a horizontal surface, the slope angle is zero (0) degrees. If the wheelchair is traveling up an incline, the slope angle may be, for example, five (5) degrees. If the wheelchair is traveling down a decline, the slope angle may be, for example, minus five (−5) degrees. As such, the present invention is configured to trigger the locking member or assembly sooner when traveling down declines (i.e., negative slope angle), compared to when traveling up inclines (i.e., positive slope angle).

As illustrated in FIG. 1, the system 100 includes a controller 101, dive lockout control logic 102, and motor/brake logic 103. Controller 101 is any computer-based controller suitable for controlling a vehicle. In this regard, controller 102 generally has a processor, memory, and input/output components (not shown). Controller 101 can also have electric motor drive circuitry associated therewith (not shown) that connects to drive motors 104 and 106. A user input device 108 such as, for example, a joystick, provides control information to the controller 101 for driving the wheelchair. A sensor 126 is provided for sensing the force acting on the center of gravity Cg of the wheelchair occupant and seat and outputs a signal S to controller 102. As will be presently described, sensor 126 can be any one of several embodiments. The remainder of system 100 includes electronic switches 110 and 112, nodes 114, 118, and 121, diodes 116 and 120, resistor 122 and solenoid coil 124. Solenoid coil 124 is part of an electronic locking member or assembly such that the state of the coil (i.e., energized or unenergized) defines the state of the locking member or assembly (i.e., locking or not locking the suspension system).

In operation, controller 101 receives driving command inputs from joystick 108. This causes controller 101 to output voltages V.sub.L and V.sub.R and current I.sub.L and I.sub.R to the left and right motors 104 and 106, respectively. Attached to each motor is a motor lock 105 and 107, respectively. All the components of the system are typically powered by battery having a positive voltage potential B+ and a ground potential "Gnd." The sensor 126 is mounted on the wheelchair so as to generate a trigger signal S when the wheelchair is tipping forward. In the presently described embodiment, the trigger signal S is an electronic signal. In other embodiments, this can be a mechanical signal such as that generated by a push-pull cable assembly.

Solenoid coil 124 is controlled by the state of electronic switch 112. The locking member or assembly associated with solenoid coil 124 is preferably in its unlocked state when solenoid coil 124 is energized and in its locked state when solenoid coil 124 is unenergized. Alternatively, the opposite configuration can also be employed.

Nodes 114 and 118 and diodes 116 and 120 form an OR circuit that controls the state of electronic switch 112 and, hence, the energy state of solenoid coil 124. More specifically, node 114 forms one input to the OR circuit and relates to the state of the motor brakes. For example, when the motors are being driven, the brakes disengage and motor/brake logic 103 causes node 114 to be at 5V. This, in turn, causes electronic switch 112 to close thereby energizing solenoid coil 124 and releasing the locking member or assembly from locking the wheelchair suspension. When the motors are not being driven, the brakes are engaged and motor/brake logic 103 causes node 114 to be at 0V. This causes electronic switch 112 to open, which de-energizes solenoid coil 124 thereby engaging the locking member or assembly to lock the suspension.

Node 118 forms the second input to the OR circuit and relates to input provided by sensor 126 for detecting when conditions may exist that indicate the wheelchair may start exhibiting a tipping behavior. More specifically, if sensor 126 is not indicating that conditions exist under which wheelchair may exhibit a tipping behavior, dive lockout control logic 102 interprets this state and causes node 118 to be at 5V. This, in turn, causes electronic switch 112 to close thereby energizing solenoid coil 124 and releasing the locking member or assembly from locking the wheelchair suspension. When sensor 126 senses that conditions exist for a tipping behavior, dive lockout control logic 102 interprets this state and causes node 118 to be at 0V. This, in turn, causes electronic switch 112 to open thereby de-energizing relay 124 and engaging the locking member or assembly to lock the wheelchair suspension.

Figure 2:
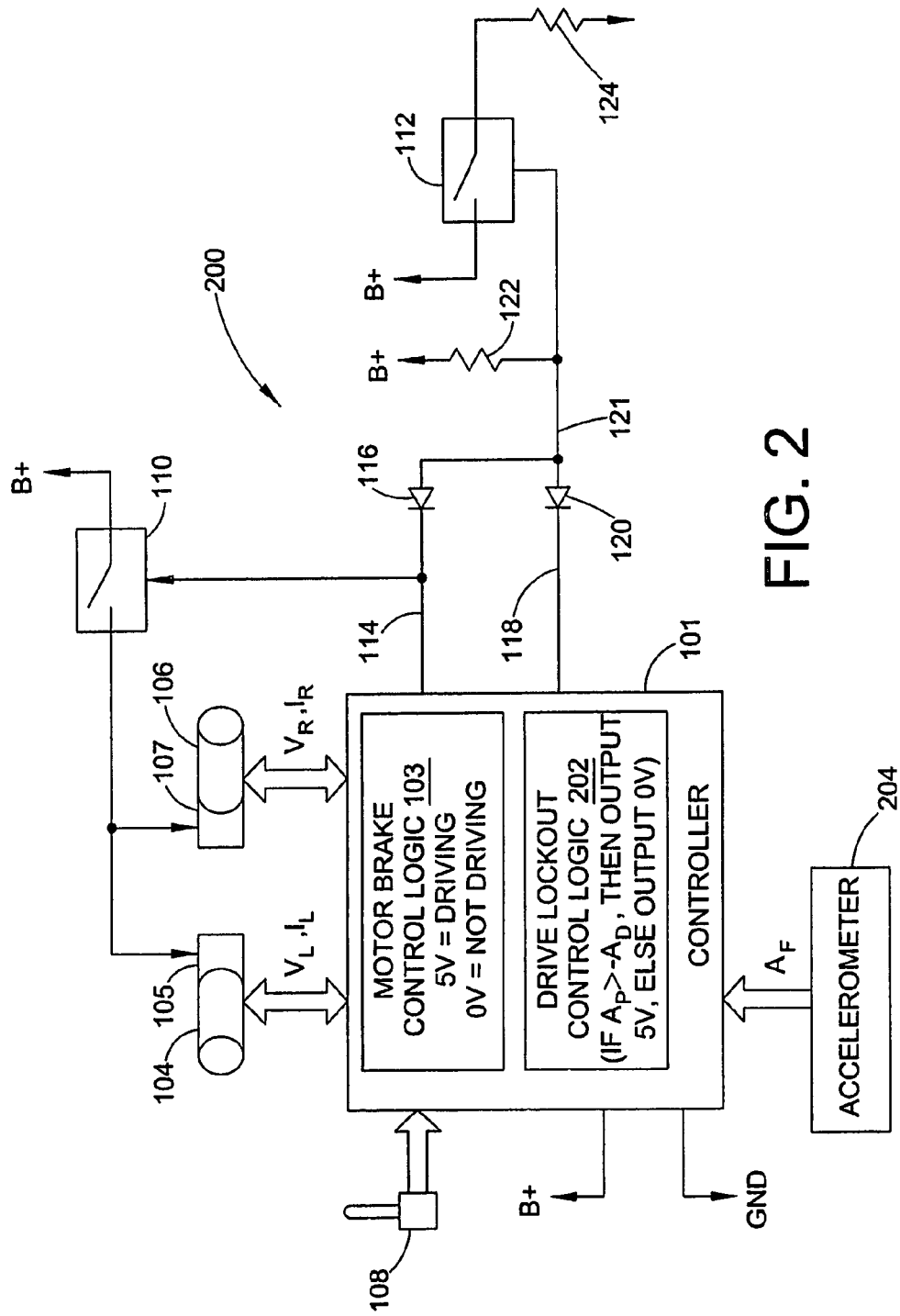
FIG. 2 is a block diagram of a second embodiment of an electronic-based stabilization system.

Illustrated in FIG. 2 is an embodiment 200 of a stabilization system similar to embodiment 100 of FIG. 1. In embodiment 200, the sensor 126 (of embodiment 100) includes an accelerometer 204 that produces an acceleration input signal $A_F$ to controller 101. Accelerometer 204 can be any convention accelerometer that provides an output signal that is proportional to the sensed acceleration. In one embodiment, accelerometer 204 can be an appropriately damped pendulum mercury switch. In another embodiment, accelerometer 204 can be an electronic accelerometer such model no. ADXL202 manufactured by Analog Devices of Norwood, Mass. Accelerometer 204 is preferably located on or near the wheelchair seat proximate the center of gravity Cg of the wheelchair seat and occupant.

The operation of embodiment 200 is substantially the same as embodiment 100, except that the state of node 118 is dependent on acceleration signal $A_F$. The acceleration signal $A_F$ is compared by the dive lockout control logic 202 to a dive threshold acceleration parameter $A_D$, which may be negative ($-A_D$) indicating wheelchair deceleration. The value of dive threshold acceleration parameter $A_D$ can be either calculated based on the weight of the wheelchair and occupant or determined experimentally with the actual wheelchair and a range of seat occupant weights. As such, dive threshold acceleration parameter $-A_D$ is a parameter that is used by the dive lockout control logic 202 to determine if conditions are present under which the wheelchair may exhibit a tipping behavior. When dive lockout control logic 202 determines that acceleration signal $A_F$ is more negative than dive threshold parameter $-A_D$, it drives node 118 to 0V. This causes electronic switch 112 to open thereby de-energizing solenoid coil 124 and causing the locking member or assembly to lock the wheelchair suspension. Acceleration signal $A_F$ is negative when the wheelchair is decelerating or facing a downward slope or decline. Otherwise, node 118 is maintained at 5V thereby causing electronic switch to close. This, in turn, causes solenoid coil 124 to be energized thus releasing the locking member or assembly from locking the wheelchair suspension.

Figure 3:
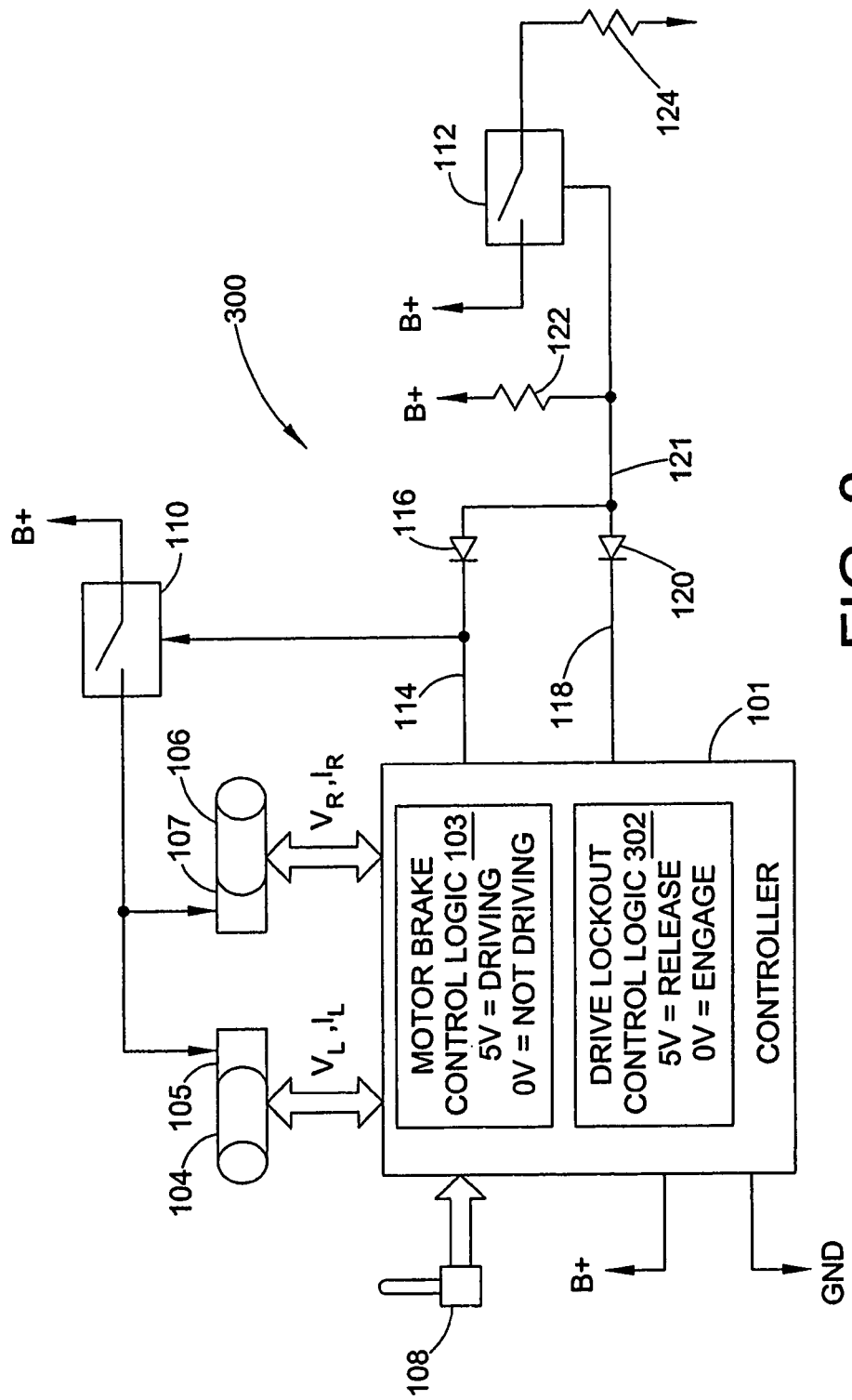
FIG. 3 is a block diagram of a third embodiment of an electronic-based stabilization system.

Referring now to FIG. 3, an embodiment 300 of an electronically-based stabilization system is shown. Embodiment 300 is substantially similar to embodiment 100, except that sensor 126 includes a motor voltage and/or current sensor, which can be incorporated into controller 101. In this regard, controller 101 can incorporate an analog-to-digital (A/D) converter circuit or can include an external A/D circuit. This A/D circuit converts analog signals such as, for example, voltage or current signals, to digital or binary signals for input into or interpretation by controller 101. Connected therewith, controller 101 also includes dive lockout control logic 302 for interpreting these voltage and/or current signals.

The operation of embodiment 300 is substantially similar to embodiment 200, except that dive lockout control logic 302 interprets how hard the motor is being driven and dynamically braked to determine whether the locking member or assembly will lock or release the suspension system. In this regard, node 114 behaves as earlier described. Node 118 is driven to 0V when the wheelchair is traveling forward and there is a large amount of dynamic braking being generated by motors 104 and 106. Node 118 is also driven to 0V if the wheelchair is accelerating hard in the reverse direction of travel. Otherwise, node 118 is driven to 5V. As used herein, dynamic braking generally refers to the process by which a motor's windings are short-circuited when the motor is not being driven so that the residual rotational energy of the motor causes the motor to act as a generator that generates a voltage and current. By recirculating the current generated of this configuration, the motor dynamically brakes itself. The behavior of node 118, as described above, is further embodied by Equations (1) and (2) below: If $(V_L+V_R)>0$ and $(I_L+I_R)<-I_D$, then output 0V on node 114 Eq. (1) If $(V_L+V_R)<0$ and $(I_L+I_R)>I_D$, then output 0V on node 114 Eq. (2) In the above equations, $V_L$, $V_R$, $I_L$, and $I_R$ are the approximate terminal voltages and currents of motors 104 and 106, respectively. Variable $I_D$ is a threshold parameter representing a current level that is used to determine when the motors are being dynamically braked. The value of threshold parameter $I_D$ can be calculated based on the motor specification and weight of the wheelchair and occupant or determined experimentally based on the actual wheelchair weight and a range of seat occupant weights. Equation (1) causes node 118 to be driven to 0V when the wheelchair is traveling forward ($(V_L+V_R)>0$) and the motors are dynamically braking themselves ($(I_L+I_R)<-I_D$). Equation (2) also causes node 118 to be driven to 0V when the wheelchair is accelerating hard in the reverse direction ($(V_L+V_R)<0$) and the motors are not dynamically braking themselves ($(I_L+I_R)>I_D$). As described earlier, when node 118 is driven to 0V, electronic switch 112 opens thereby causing solenoid coil 124 to de-energize. De-energizing solenoid coil 124 causes the locking member or assembly to lock the suspension system. Otherwise, node 118 is driven to 5V, which causes electronic switch 112 to close thereby energizing solenoid coil 124. Energizing solenoid coil 124 causes the locking member or assembly to unlock or release the suspension system. Alternatively, energizing solenoid coil 124 can cause the locking member or assembly to unlock or release the suspension system and de-energizing solenoid coil 124 can cause the locking member to lock the suspension system.

Referring now to FIG. 4, one embodiment of a mechanically-based stabilization system is shown. In this regard, a locking member 420, push-pull cable 424, and pivotal rear castor assembly 416 are provided. Push-pull cable 424 has a first conduit portion attached to a bracket 430 on rear caster frame member 418 and a second portion attached to a locking member control bracket assembly 432. Push-pull cable 424 also has a first cable portion attached to a rear castor pivot bracket portion 428 and a second cable portion attached to a locking member control arm 422.

Locking member 420 is pivotally connected to frame 402 and pivot arm 404. This is accomplished through a conventional pivot assembly that includes pins or bolts extending through mounting brackets. A second similar locking member and push-pull cable are associated with a second pivot arm on the other side of frame 402 and identically configured to locking members 404 and push-pull cable 424.

In this regard, locking member 420 is preferably a lockable spring device. Examples of such devices include lockable gas or hydraulic springs that include piston valve assemblies for locking the springs in a predetermined position. Such lockable gas or hydraulic springs include, for example, the BLOC-O-LIFT®, STAB-O-MAT®, and STAB-O-BLOC® models of gas springs as manufactured by STABILUS GMBH, Koblenz, Germany. In the preferred embodiment, arm 422 is mechanically linked to the reciprocating rod that opens and closes the piston valve assembly of the locking member 404.

In operation, when rear castor 414 is contacting the driving surface, push-pull cable 424 causes arm 422 to be pulled toward bracket 432. This state causes locking member 420 to be in its unlocked state thereby allowing pivot arm 404 to pivot about pivotal connection 406 as front castor 412 traverses bumps and obstacles on the drive surface. However, when the wheelchair begins to exhibit a tipping behavior (e.g., tipping forward), rear caster 414 will pivot about connection 426. Rear castor 414 may or may not completely come off of the driving surface. This causes the cable within push-pull cable 424 to displace. This displacement is translated to arm 422, which begins to separate from control bracket 432. When arm 422 separates from control bracket 432, the locking member enters the locked state thereby locking pivot arm 404 from pivotal motion about connection 406. When the wheelchair returns to its normal position, rear caster 414 pivots back to its normal ground-engaging position thereby releasing locking member 420 via push-pull cable 424. This allows pivot arm 404 to once again pivot about connection 406. Most preferably, the system is configured that if push-pull cable 424 breaks, locking member 420 automatically locks pivot arm 404. Additionally, a resilient spring device can be placed between rear caster pivot bracket portion 428 and rear caster frame member 418 to bias rear caster 414 around connection 426 towards the driving surface.

As an alternative to FIG. 4, push-pull cable 424 can be replaced by a limit switch designed to sense the motion of rear caster pivot bracket portion 428 and a solenoid actuator configured to act upon arm 422 upon movement of the rear caster pivot bracket portion 428 during a wheelchair tipping motion. In this regard, one or more wires connect the limit switch to the solenoid actuator. In yet another alternative, push-pull cable 424 can be replaced with a plurality of mechanical linkages that provide the same effect on arm 422.

Illustrated in FIG. 5 is another alternate embodiment 500 to that FIG. 4. The embodiments of FIGS. 4 and 5 are substantially similar, except that the embodiment of FIG. 5 includes only one locking member 420 that is associated with both pivot arms 404 and 510. To facilitate this configuration, a link 502 is provided between the pivot arms 404 and 510. Link 502 has a first portion 504 that is pivotally connected to first pivot arm 404 and a second portion 506 that is pivotally connected to second pivot arm 510. Link 502 also has a third portion that is pivotally connected to a bottom portion of locking member 420. A top portion of locking member 420 is pivotally connected to frame 402. Though not illustrated, a push-pull cable mechanically links locking member 420 to rear caster 414 or its parallel equivalent in the same fashion as that shown in FIG. 4. The operation of embodiment 500 is similar to that described for FIG. 4, except that when locking member 420 is in the locked state, it prevents link 502 from displacement. This, in turn, prevents either pivot arm 404 or 510 from movement.

Referring now to FIGS. 6A and 6B, an embodiment 600 of a stabilization system having ratchet-type locking member or assembly 602 is shown. The locking member 602 has a pawl member 614, ratchet member 620, and a solenoid actuator 608. Pawl member 614 and solenoid actuator 608 are rigidly fixed to frame 402 via a bracket 606. Bracket 606 also serves as a guide bracket for ratchet member 620, though this function can be provided by a separate guide member. Solenoid actuator 608 has a coil 124, spring 612 and pin 613. Pawl member 614 has a first portion pivotally connected to bracket 606 and a second portion pivotally connected to pin 613. Ratchet member 620 has a plurality of cammed extensions 622 between which pawl member 614 is configured to engage and disengage. A bottom portion of ratchet member 620 is pivotally connected to pivot arm 404 at connection 604. So configured, ratchet member 620 is free to undergo reciprocating movement within the guide portion of bracket 606 as pivot arm 404 pivots about connection 406. As described earlier, solenoid actuator 608 can be controlled by any of the embodiments of FIGS. 1-4.

As such, when the wheelchair exhibits a tipping behavior, solenoid actuator 608 is de-energized causing spring 612 to urge pin 613 and pawl member 614 against ratchet member 620. This causes pawl member 614 to be locked against ratchet member 620 so as to prevent ratchet member 620 from any further upward motion, which causes tipping of the wheelchair. This state prevents the forward portion of pivot arm 404 from exhibiting any upward motion that is associated the wheelchair's tipping behavior. However, it may be desirable to allow ratchet member 620 to further move in the downward direction while pawl member 614 remains engaged therewith. This is accomplished by appropriately camming the engaging surfaces of pawl member 614 and ratchet member 620, as shown. In this manner, pivot arm 404 is free to move in a direction that would lessen the tipping behavior of the wheelchair but not increase such behavior. If the wheelchair is not exhibiting a tipping behavior or has ceased to exhibit a tipping behavior, solenoid actuator 608 is energized causing pin 613 and pawl member 614 to disengage from ratchet member 620. This allows pivot arm 404 to freely pivot about connection 406. As described earlier in connection with FIGS. 4 and 5, one or two or more locking members can be provided. Additionally, pawl member 614 can be triggered by a inertial switch or method instead of solenoid actuator 608 or one which actuates a solenoid actuator.

Referring now to FIGS. 7A and 7B, an embodiment 700 of a stabilization system having a caliper-type locking member or assembly 702 is shown. The locking member 702 has a spring 712, pin 714, one or more friction plates 710, and a linear reciprocating link 704. Pin 714 has a first portion connected to friction plate 710 and a second portion connected to either a solenoid actuator or push-pull cable, or equivalent, as described earlier for locking and unlocking the suspension system. Spring 712 is located between these portions and biases pin 714 and friction plate 710 toward link 704. The friction plates 710, spring 712, and pin 714 are housed within a frame attachment 708, which rigidly connects these components to frame 402. Attachment 708 also functions as a guide for link 704 so as to always maintain link 704 between friction plates 710. This function can also be provided by a separate guide bracket.

Link 704 has a first portion that is pivotally connected to pivot arm 404 and a second portion that travels within attachment or guide 708 so as to be engagable by friction plates 710. In this manner, as pivot arm 404 rotates about connection 406, link 704 exhibits a reciprocating up and down motion with respect to attachment 708 and friction plates 710. Preferably, two friction plates 710 are provided facing each other with a gap therebetween. The space or gap exists between friction plates 710 so as to allow link 704 to freely move therethrough until such time as the friction plate 710 connected to pin 714 is moved toward link 704 and the opposing friction plate 710.

This movement causes both friction plates 710 to engage the link 704 and to lock it in position. This, in turn, prevents pivot arm 404 from pivoting about connection 406. Hence, when the wheelchair is exhibiting a tipping behavior, pin 714 is extended allowing friction plate 710 to engage against link 704. When link 704 is locked between friction plates 710, the wheelchair will not exhibit any tipping behavior. When the conditions for a tipping behavior are absent, pin 714 is in its retracted position and link 704 can move freely between friction plates 710.

Referring now to FIGS. 8A, 8B, and 8C, an embodiment 800 of a stabilization system having a magnetic-field actionable locking member is shown. Referring specifically to FIG. 8C, embodiment 800 has a locking member 804 and an actuator assembly 802 associated therewith. Locking member 804 has a first portion 806 that is pivotally connected to pivot arm 404 and a second portion 808 that is pivotally connected to frame 402. Locking member 802 is a hydraulic piston assembly having a magnetic fluid. The piston within the assembly has a valve that allows the fluid to pass from one side of the piston to the other. However, when a magnetic field is brought near the proximity of the fluid, the magnetic field causes the fluid viscosity to greatly increase thereby not allowing the fluid to flow through the valve in the piston. This, in turn, locks the piston in position.

Illustrated in FIG. 8A is a first embodiment of the actuator assembly 802. The assembly 802 has a permanent magnet 810 that is fixed directly or indirectly to frame 802, a solenoid coil 812 and a switch 814. Solenoid coil 812 can be the same component as solenoid coil 124 and switch 814 can be mechanical or electronic, as described in connection with FIGS. 1-4. In operation, magnet 810 causes the fluid in locking member 804 to have a very high viscosity and, hence, almost no ability to flow. This maintains locking member 804 in a locked stated thereby locking pivot arm 404 from pivoting about connection 406. However, when solenoid coil 812 is energized by switch 814, its magnetic field cancels with the magnetic field generated by magnet 810 and allows the fluid in locking member 812 to have a very low viscosity and, hence, the ability to flow relatively easily. This allows locking member 804 to move in accordance with the movement of pivot arm 404 about pivotal connection 406. Hence, if power is lost, magnet 810 provides a failsafe condition which automatically locks locking member 804. Therefore, it can be seen that when the wheelchair exhibits a tipping behavior, solenoid coil 812 is de-energized causing locking member 804 to lock pivot arm 404. When no tipping behavior is exhibited by the wheelchair, solenoid coil 812 is energized and locking member 804 is not in its locked state.

Illustrated in FIG. 8B is a second embodiment of an actuator assembly 802. This embodiment has the earlier described push-pull cable 424 spring-loaded against magnet 810. In this embodiment magnet 810 moves either toward or away from the locking member 804 so as to either bring its magnetic field in operative proximity to the locking member or away from the locking member. As described in connection with FIG. 4, push-pull cable 424 provides for linear mechanical movement upon a tipping condition of the wheelchair. By having push-pull cable 424 fixed to magnet 810, the linear movement of push-pull cable 424 can be used to move magnet 810 closer to locking member 804 so as place it in its locked state, or away from locking member 804 so as to place it in its unlocked state. Spring is also provided so as to bias magnet 810 towards locking member 804 ensuring that locking member 804 is in its locked state should push-pull cable 424 break.

Figure 9:
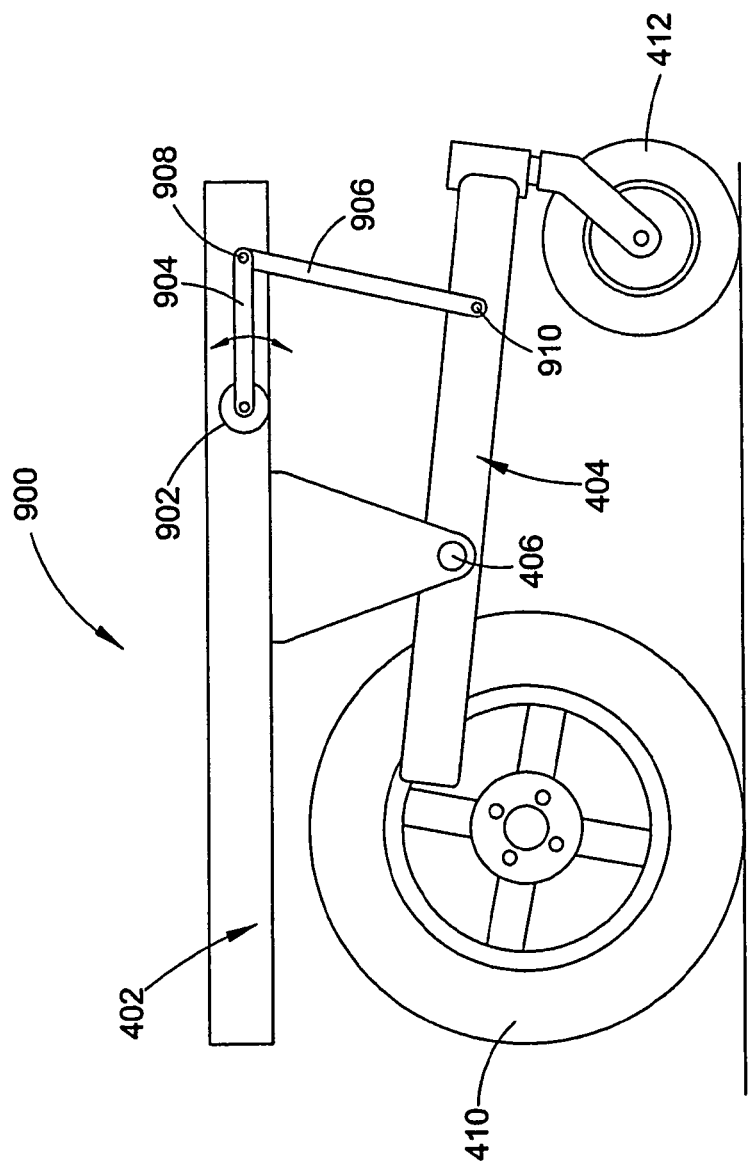
FIG. 9 illustrates a fourth embodiment of a locking member or assembly.

Referring now to FIG. 9, an embodiment 900 of a suspension system having a sprag clutch locking member 902. Sprag clutch locking member 902 allows rotational movement in one direction and not in the other. Alternatively, locking member 902 can be a bi-directional clutch. Bi-directional clutches allow their input to drive their output in either rotational directions, but do not allow the output to drive the input.

FIGS. 10A, 10B and 10C illustrate one embodiment 1000 of a suspension system having a direct acting pin locking member 1002. Locking member 1002 extends and retracts its pin 1008 so as to enter one of a plurality of slots or apertures in locking bracket 1004. In this regard, locking member 1002 has a spring-loaded pin 1008 and an actuator cable 1006. If locking member 1002 is mechanical, then actuator cable 1006 can be a push-pull cable, as described earlier. If locking member 1002 is solenoid driven, then actuator cable 1006 can be an electric cable that carries the signal that actuates the solenoid. The locking member 1002 can also be pneumatically actuated through known means. So configured, locking member 1002 is affixed to the frame 402 through mounting brackets (not shown) or its housing.

Locking bracket 1004 is affixed to pivot arm 404 and moves therewith. In this regard, locking bracket 1004 preferably includes an arcuate shape so as to maintain alignment with locking member 1002 as pivot arm 404 pivots or rotates. Locking bracket 1004 includes a plurality of apertures or slots that disposed along the bracket's arcuate body. The apertures can be any shape such that pin 1008 can enter thereinto. Pivot arm 510 (not shown) would have a similar suspension system.

Illustrated in FIG. 10C is detail of an alternative embodiment of pin 1008. More specifically, FIG. 10B shows pin 1008 having flat head portion at its engaging distal end. FIG. 10C shows an embodiment of pin 1008 having a cammed surface 1010 at its engaging distal end. Cammed surface 1010 is provided so that when pin 1008 is engaged in locking bracket 1004, pivot arm 404 can pivot in the downward direction. This causes a ratcheting effect where cammed surface 1010 causes pin 1008 to retract under the downward tendency (i.e., clockwise rotation) of pivot arm 404. However, configured as such, pin 1008 does not allow a corresponding ratcheting in the upward direction (i.e., counter-clockwise rotation) of pivot arm 404.

In operation, pin 1008 of locking member 1002 is spring-engaged into an aperture of locking member 1004. Actuator cable 1006, when active, causes pin 1008 to retract from locking bracket 1004. In this manner, a failsafe configuration is provided should actuator cable 1006 fail. The triggering of locking member 1002 can be by any of the embodiments described in FIGS. 1-4.

Illustrated in FIGS. 11A and 11B an embodiment 1100 of a suspension system having an axial spring locking member 1002. In particular, locking member 1102 has an actuator member 1108. Actuator member 1108 can be a spring-loaded pin, solenoid driven pin, or a mechanical clamp (not shown). Actuator member 1108 is actuated by an actuator cable 1110, which can be an electric cable, pneumatic hose, or push-pull cable. Locking member 1102 further has a housing 1112 that includes a spring 1113 that axially receives a locking rod or tube 1106 therein. Locking member 1102 is rigidly affixed to frame 402 with mounting brackets (not shown).

Spring 1113 is a coil spring that includes first and second extensions 1114 and 1116, respectively. Spring 1113 is arranged so that when extensions 1114 and 1116 are not acted upon by any force, spring 1113 is tightly coiled around locking rod or tube 1106 so as to prevent any axially movement of locking rod or tube 1106 within spring 1113. Since locking rod or tube 1106 has one of its distal ends pivotally fixed to pivot arm 404 at 1104, pivot arm 404 is also locked from any rotational movement. In this manner, a failsafe configuration is provided should actuator cable 1110 fail. The triggering of locking member 1102 can be by any of the embodiments described in FIGS. 1-4.

To release locking rod or tube 1106 from spring 1113, extensions 1114 and 1116 are acted upon by a force. In this regard, extensions 1114 and 1116 can be configured so that either a force that brings them closer together or a force that brings them farther apart causes spring 1113 to become loosely coiled around locking rod or tube 1106. Once loosely coiled, spring 1113 allows locking rod or tube 1106 to axially move therein. This, in turn, allows pivot arm 404 to pivot about its connection at 403. Pivot arm 510 (not shown) would have a similar suspension system.

Figure 12A:
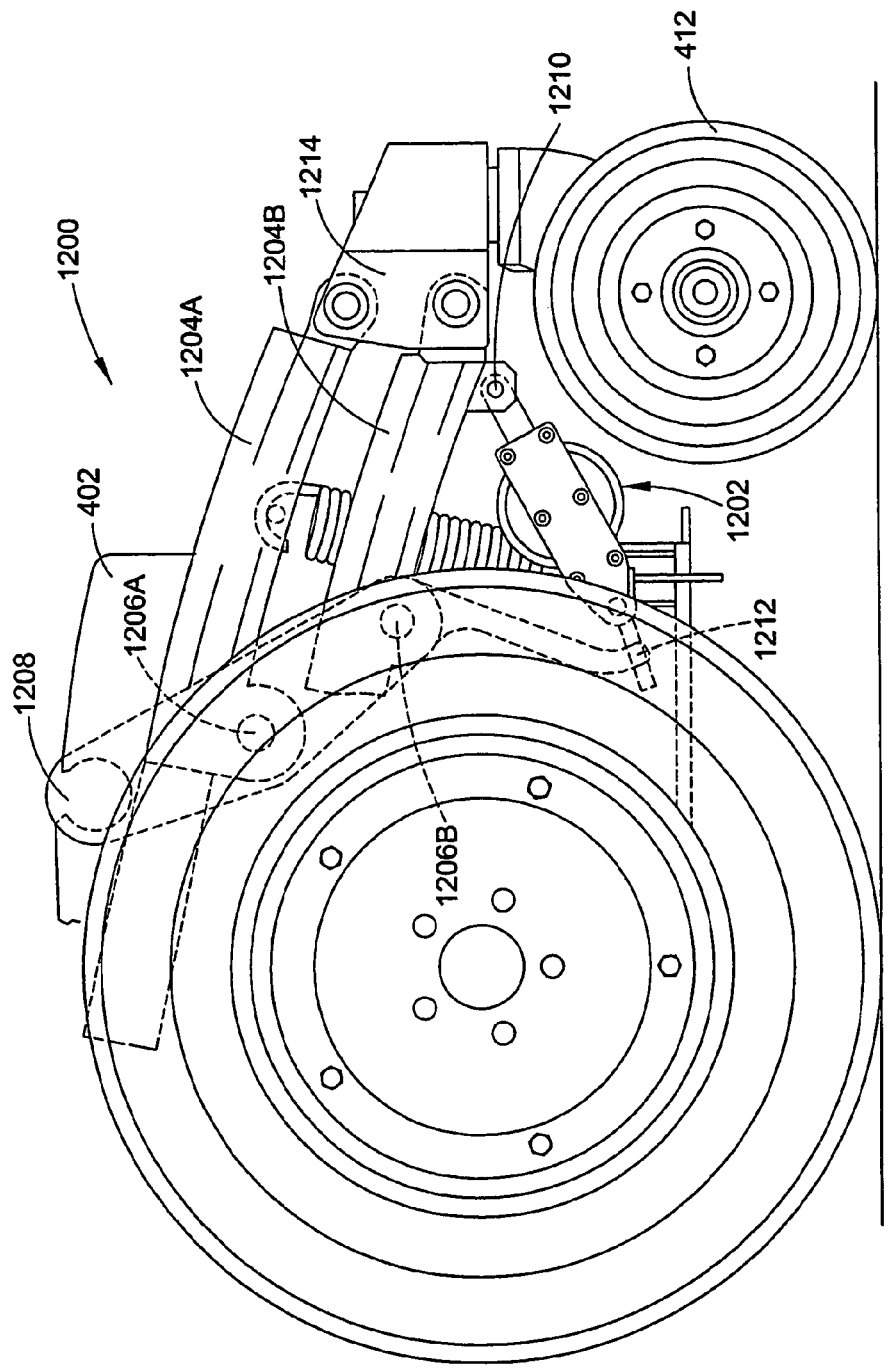
FIGS. 12A through 12I illustrate a seventh embodiment of a locking member or assembly.
Figure 12B:
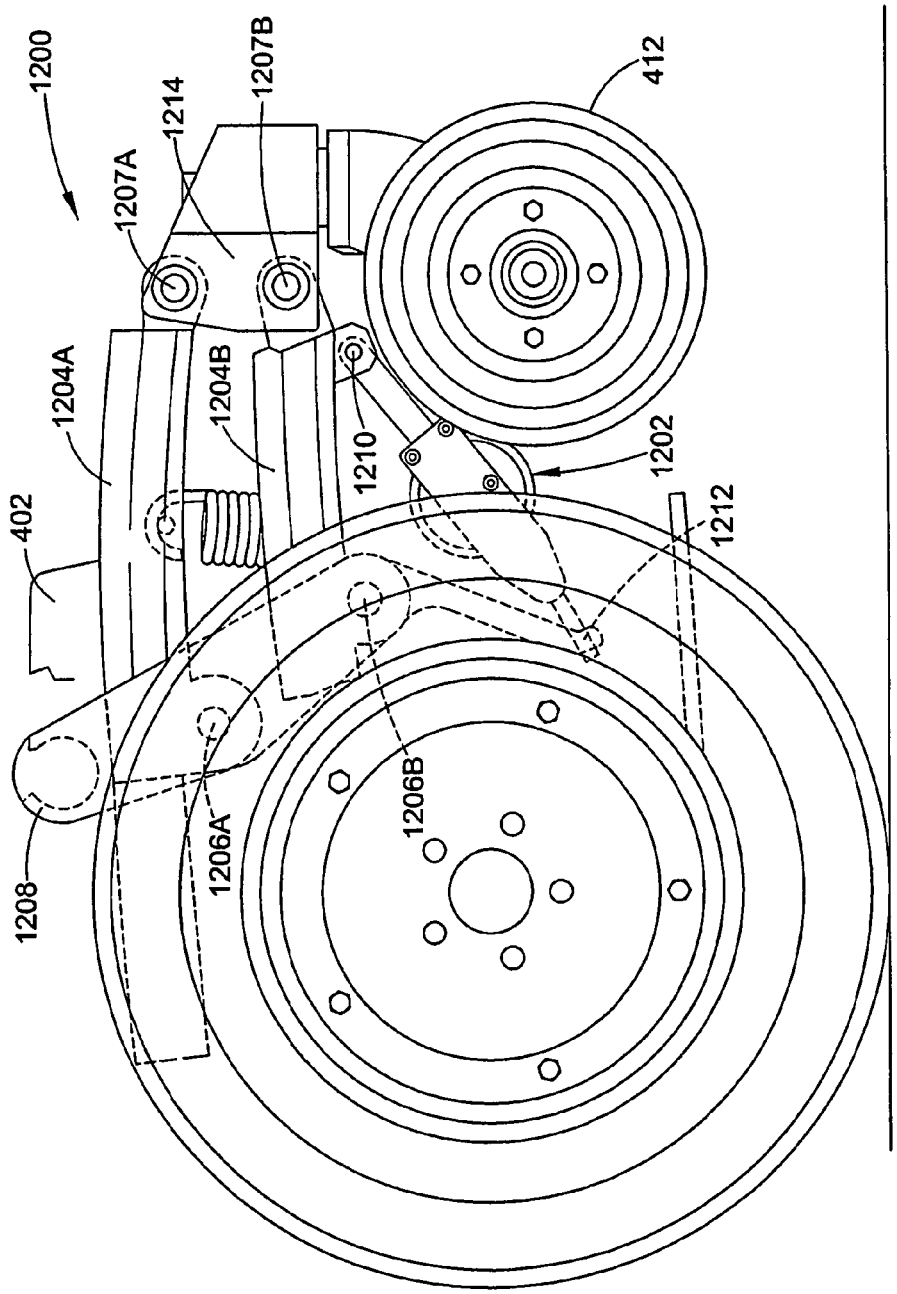
Figure 12C:
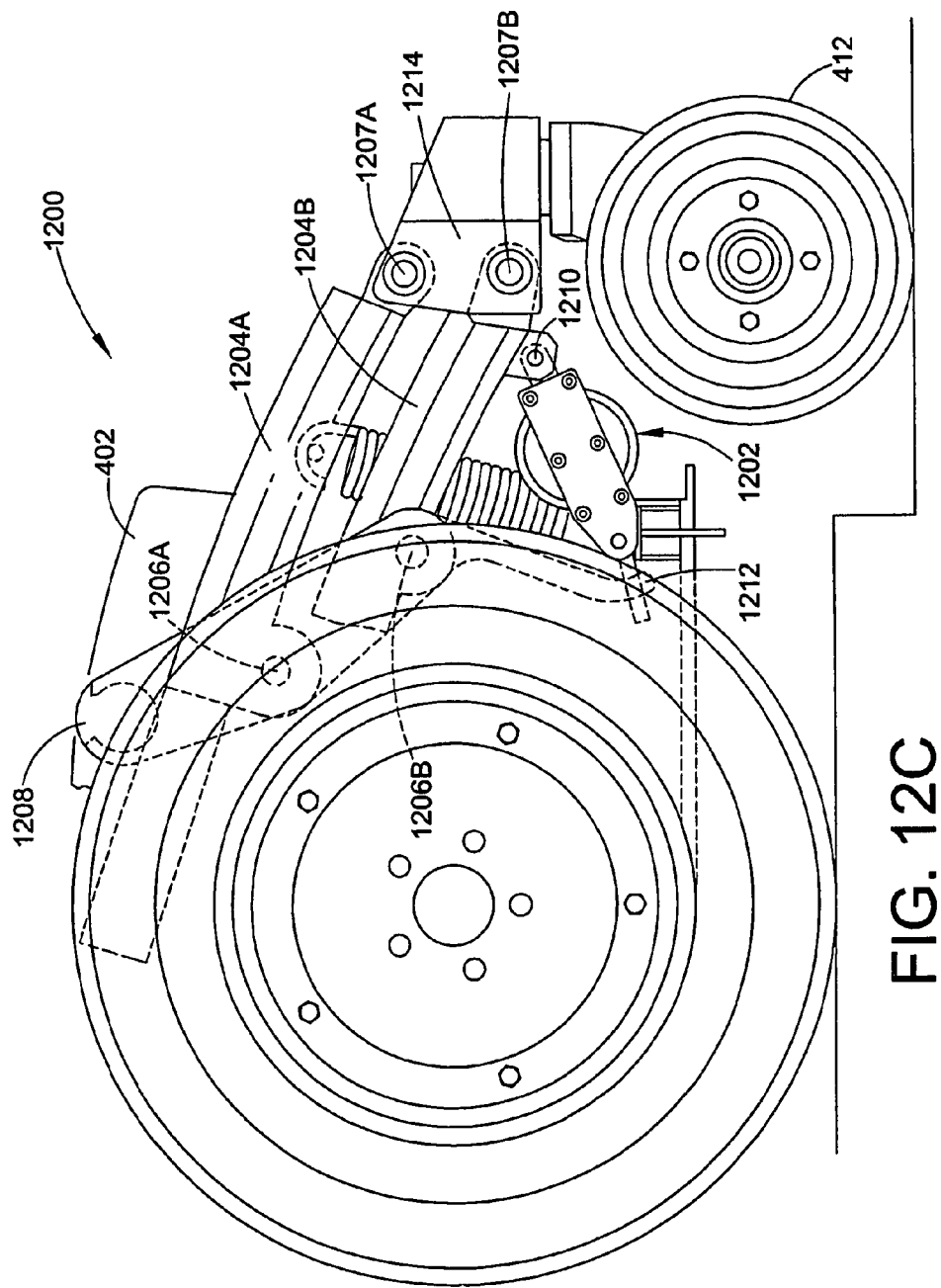
Figure 12D:
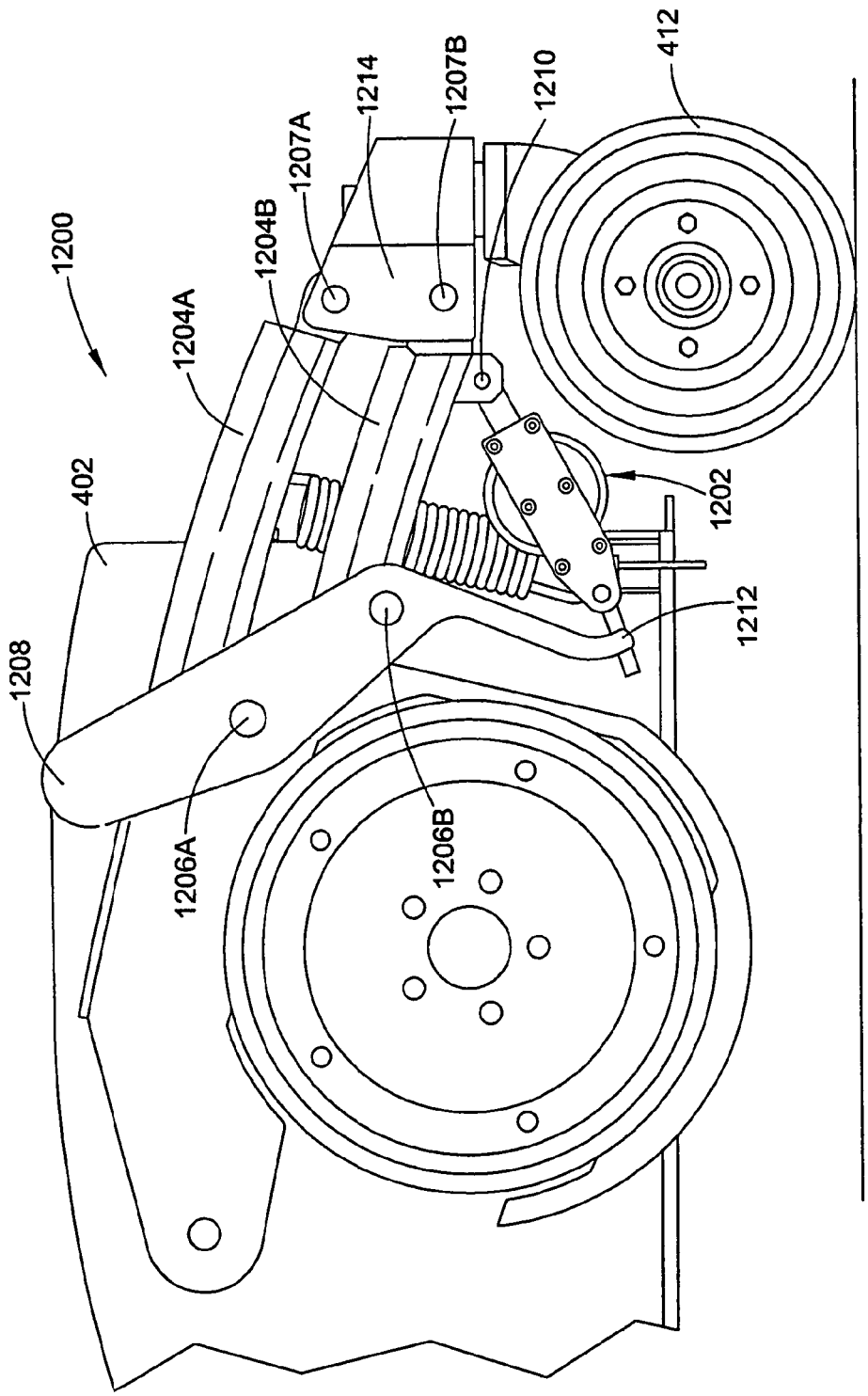

Referring now to FIGS. 12A, 12B, 12C, 12D, and 12E, an embodiment of a suspension system 1200 having an linear locking member 1202 is shown. FIG. 12A shows the suspension system on a level driving surface. FIG. 12B illustrates the suspension system wherein front caster 412 is lifted by the suspension off of the driving surface. FIG. 12C shows the suspension system wherein front caster 412 has been lowered onto a lower driving surface. FIG. 12D illustrates the suspension 1200 with the drive wheel removed and FIG. 12E is a partial perspective view of the suspension 1200.

Suspension system 1200 further includes a four-bar pivoting assembly that includes pivot arms 1204A and 1204B, caster head tube bracket 1214, and frame 402. Bracket 1208, while a separate component, can be considered as part of frame 402. Pivot arms 1204A and 1204B are pivotally connected to frame 402 via pivotal connections 1206A and 1206B. Pivot arms 1204A and 1204B are also pivotally connected caster head tube bracket 1214 via pivotal connections 1207A and 1207B.

Locking member 1202 is shown having a first pivotal connection 1210 to pivot arm 1204B and a second pivotal connection 1212 to bracket 1208. So connected locking member is under the influence of pivot arms 1204A and 1204B. It should be noted that locking member 1202 pivotal connection 1210 can be alternatively located on pivot arm 1204A or caster head tube bracket 1214, as well.

FIG. 12F illustrates a partial cross-section of locking member 1202. Locking member 1202 has a first housing 1220 and a second housing 1222. First housing 1220 retains therein a electric solenoid actuator 1230 that includes a coil and a plunger 1232 biased by leaf spring 1228. A cover 1226 is provided on housing 1220 that has an aperture that allows plunger 1232 to at least partially project there from. The projecting portion of plunger 1232 has a pivotable lever 1224 connected thereto. Pivoting of the lever through manual actuation causes plunger 1232 to move without the need for electrical energy.

Second housing 1222, which is attached to first housing 1220 includes a channel or passage 1234 therein. A rod member 1236 moves within passage 1234 and includes a notch 1238 therein. Notch 1238 is configured such that when plunger 1232 is biased into passage 1234, plunger 1232 will come into locking engagement with notch 1238 and remain there until withdrawn. Alternatively, notch 1238 can be replaced by a ratcheting tooth configuration similar to that shown in FIG. 6B.

Figure 12G:
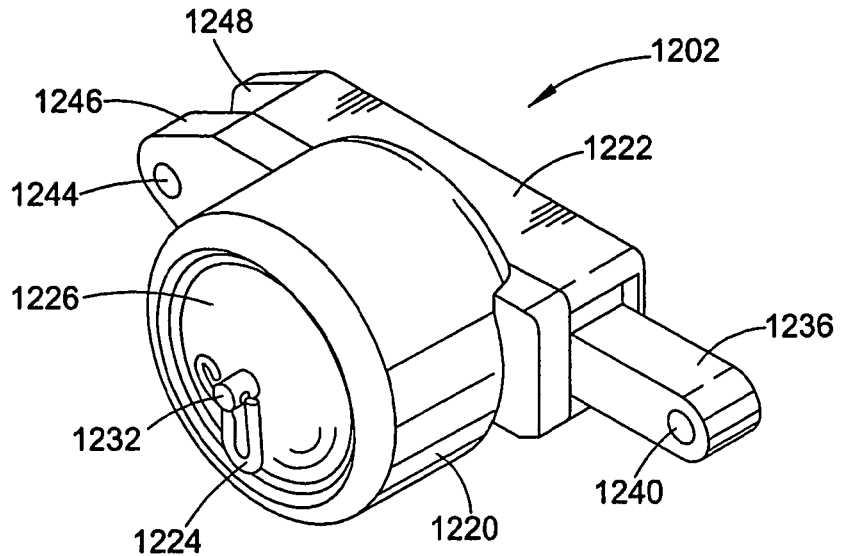
Figure 12H:
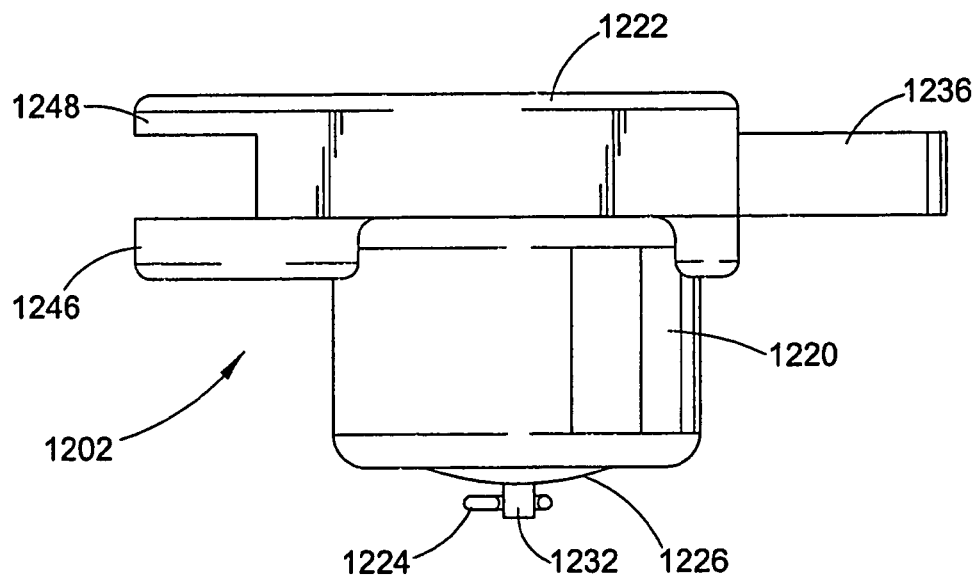
Figure 12:
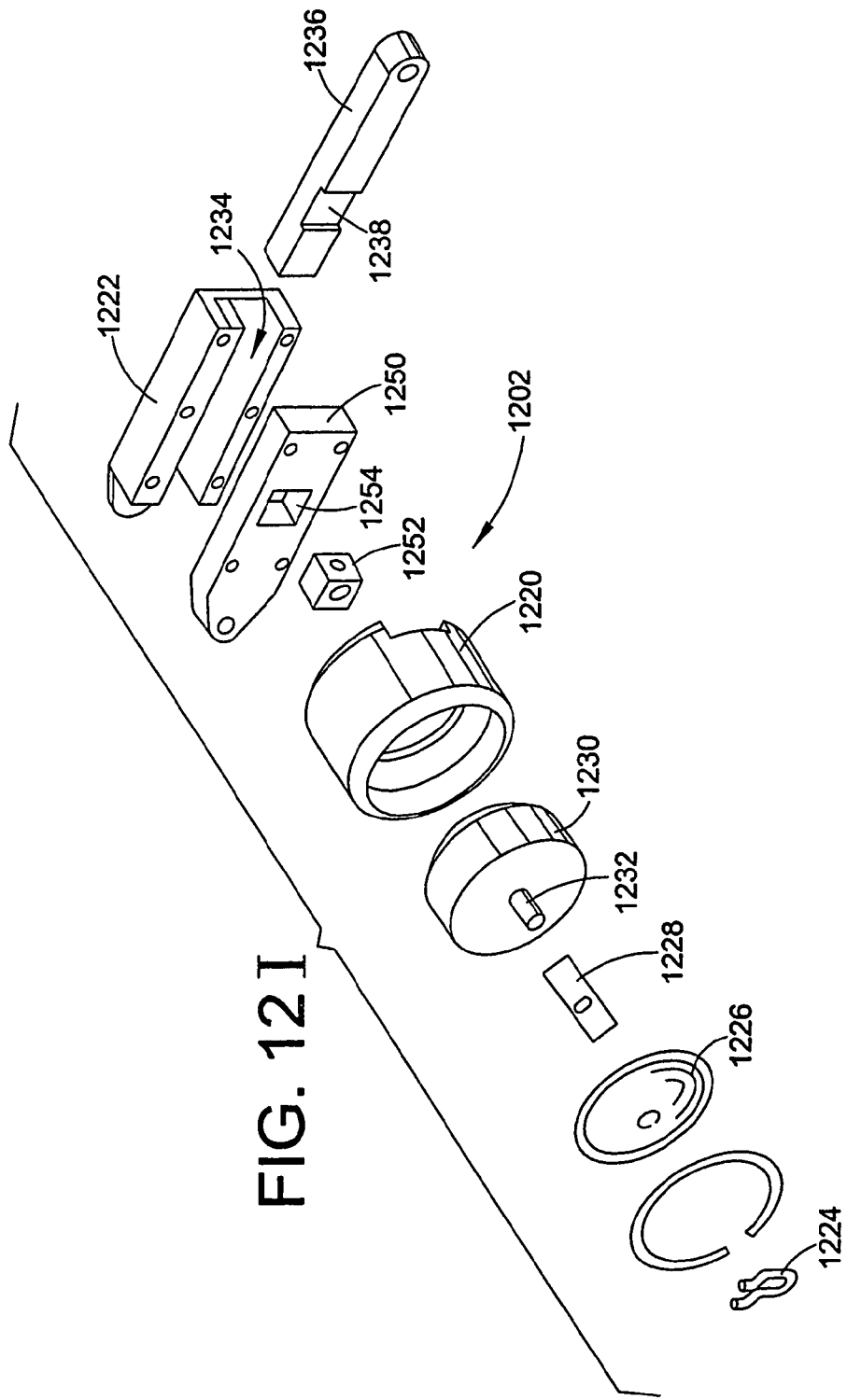

Referring now to FIGS. 12G and 12H, perspective and top views of locking member 1202 are illustrated. Rod member 1236 includes at one distal end an aperture 1240, which accepts a pin or similar fastener in forming pivotal connection 1210. Additionally, second housing 1222 includes at one distal end first and second extensions 1246 and 1248, each of which have aligned apertures 1244. Extension 1246 and 1248 accept in the space between them a pivoting bracket member that is used secure the locking member 1202 to bracket 1208.

Illustrated in FIG. 121 is an exploded perspective view of locking member 1202. In addition to the above-mentioned components, locking member 1202 further includes a block 1252 that is affixed to plunger 1232. Block 1252 increases the effective cross-section of plunger 1238 which is responsible for locking engagement with rod member 1236. Housing 1222 has a cover portion 1250 that includes an aperture 1254 having substantially the same shape as block 1252 and allows block 1252 to reciprocate there within.

In operation, locking member 1202 locks the suspension system when, for example, the vehicle is not moving and motor parking brake or lock is actuated. This creates a stable platform for the user to transport in and out of the vehicle or wheelchair. Locking member 1202 is also preferably configured to lock suspension system when the is no power or the power system has been shut off. This is achieved by always biasing plunger 1232 into locking engagement with rod member 1236. Upon power-up, solenoid 1230 is actuated and plunger 1232 is withdrawn from the locking engagement.

So configured, locking member 1202 can be alternatively located among a plurality of positions the on suspension system 1200. For example, locking member 1202 can be attached between the frame 402 and upper pivot arm 1204A, attached between the upper and lower pivot arms 1204A and 1204B, or between any two components of the described four-bar pivoting assembly. Additionally, locking member 1202 can be triggered by any of the mechanisms described earlier electrical or mechanical.

Figure 13:
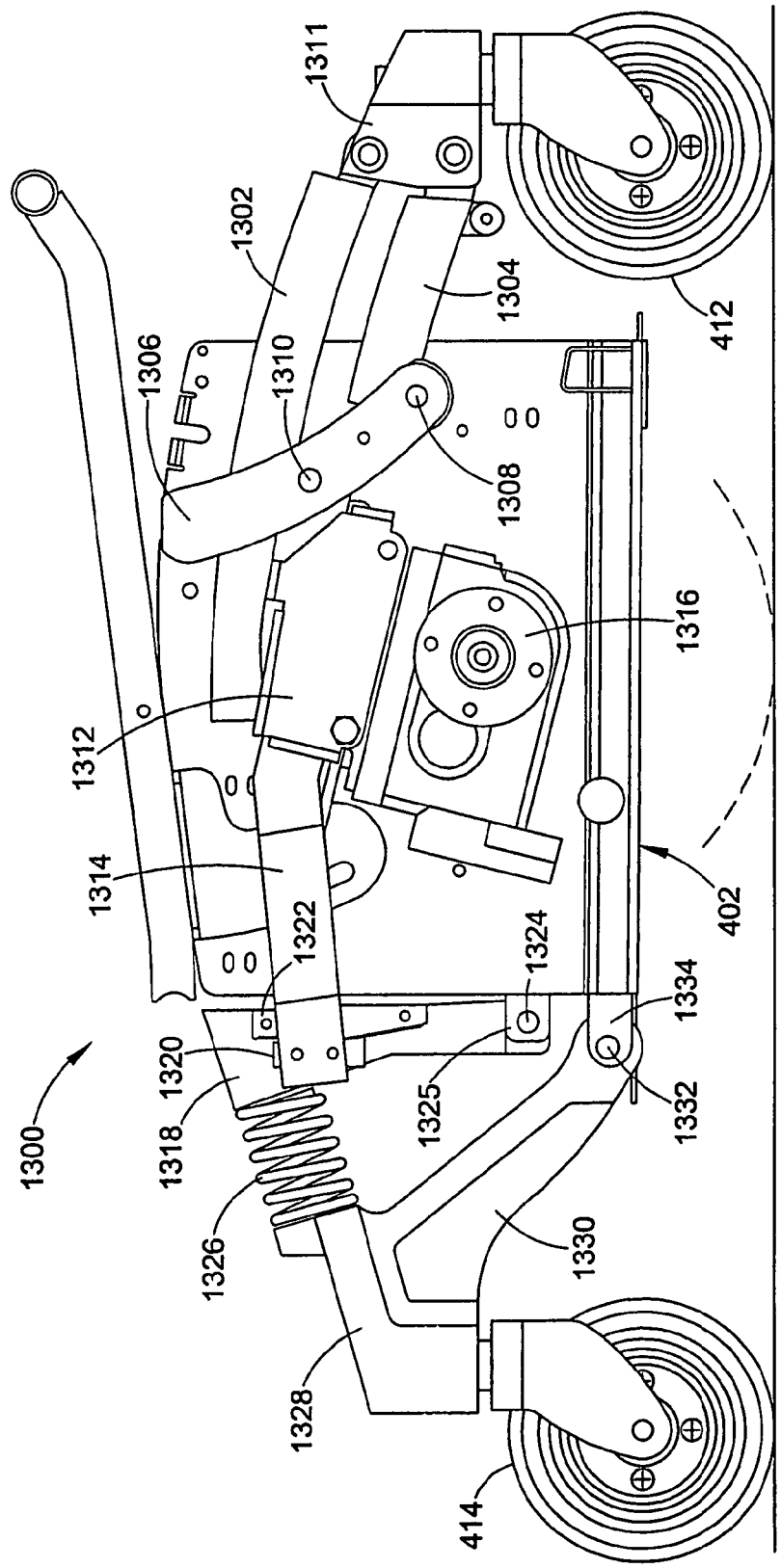

Illustrated in FIG. 13 is an eighth embodiment of a locking assembly of the present invention. The locking assembly has a motor rack bracket 1314, first ratchet 1320, second ratchet 1322 and a spring mount 1318. So configured, the locking assembly is shown mounted on the vehicle frame 402, which includes a four-bar linkage pivoting front caster assembly. The four-bar linkage pivoting caster assembly includes first and second linkages 1302 and 1304. A third linkage is provided by frame 402 and its extension in the form of frame bracket 1306. A fourth linkage is provided by caster head tube assembly 1311. First linkage 1302 is pivotally connected to frame 402 at pivot 1310 and second linkage 1304 is pivotally connected to frame 402 at pivot 1308. A more detailed discussion of this four-bar linkage pivoting front caster assembly can be found in pending U.S. patent application Ser. No. 09/974,348, filed on Oct. 10, 2001, which is hereby fully incorporated by reference.

The locking assembly's motor rack bracket 1314 is physically connected to first linkage 1302 through a motor/gearbox mount 1312. The connection can also be made directly if desired. A gearbox 1316 is also shown connected to motor/gearbox mount 1312. First ratchet 1320 is attached to motor rack bracket 1314 at an end portion opposite the connection to first linkage 1302. So configured, motor rack bracket 1314 pivots when first linkage 1302 pivots.

The locking assembly's spring mount 1318 is pivotally connected to frame 402 through clevis 1325. The second ratchet 1322 is affixed to a side portion of the spring mount 1318. Clevis 1325 and its pivotal connection 1324 allow spring mount 1318 to pivot with respect to frame 402. In an alternate embodiment, pivotal connections 1324 and 1332 and devises 1325 and 1334 can be combined into a single integrated clevis and pivotal connection. For example, clevis 1325 can be eliminated and pivotal connection 1324 integrated into pivotal connection 1332.

In another embodiment, an elastic member such as, for example, a spring, can be positioned between spring mount 1318 and frame 402. Such a spring would urge or assist the pivotal movement of spring mount 1318 away from frame 402, as will be described below. To facilitate such a spring, spring mount 1318 would include a bearing surface for bearing against one end of the spring and a spring holder. This configuration can take the form of pin or bolt at least partially received within the spring, which such configuration may additionally be at least partially received within a recess in spring mount 1318. The other end of the spring would bear against a bearing surface on frame 402. Alternatively, such a configuration can be reversed between the spring mount 1318 and frame 402.

A rear caster mount 1328 pivotally connects rear caster 414 to frame 402. More specifically, rear castor mount 1328 has an extension 1330 that includes a first distal end pivotally connected to clevis 1334 and a second distal end connected to a head tube portion for mounting the rear caster 414. A spring 1326 is situated between rear castor mount 1328 and spring mount 1318. Spring 1326 compresses when rear caster mount 1328 pivots clockwise as shown in FIG. 13 toward frame 402. In this manner, spring 1326 provides a degree of suspension for the rear caster mount 1328. Alternatively, if no degree of suspension is desired, spring 1326 can be replaced by a non-resilient member resulting in spring mount 1318 and rear caster mount 1328 being an integrated and rigid structure. As described above, such an integrated structure can employ a single integrated pivot at pivotable connection 1332, as opposed to pivotable connections at 1324 and 1332.

In operation, first and second ratchets 1320 and 1322 engage each other in one of a plurality of releasable locking states whenever rear caster 414 is about to be lifted from its supporting surface. This condition occurs whenever the frame 402 pivots or tilts forward toward front caster 412. When frame 402 pivots or tilts forward, first and second pivot arm linkages 1302 and 1304 correspondingly pivot about their pivotal connection 1310 and 1308, respectively. Any pivotal movement of linkages 1302 or 1304 translates to pivotal movement of motor rack bracket 1314 and first ratchet 1320 by virtue of their mechanical coupling. As this condition occurs, rear caster mount 1328 pivots about its pivotal connection at 1332 causing spring mount 1318 to pivot about its pivotal connection at 1324 so that second ratchet 1322 comes into contact with first ratchet 1320. When first and second ratchets 1320 and 1322 come into contact forming a releasable locking state, pivot arm linkages 1302 and 1304 are releasably locked thereby locking frame 402 from any additional pivoting or tilting forward. When frame 402 resumes its normal level position, rear caster mount 1328 pivots clockwise causing spring mount 1318 to pivot clockwise and disengage second ratchet 1322 from first ratchet 1320. This releases first and second pivot arm linkages 1302 and 1304 from their locked state so that they may once again freely pivot.

Figure 16:
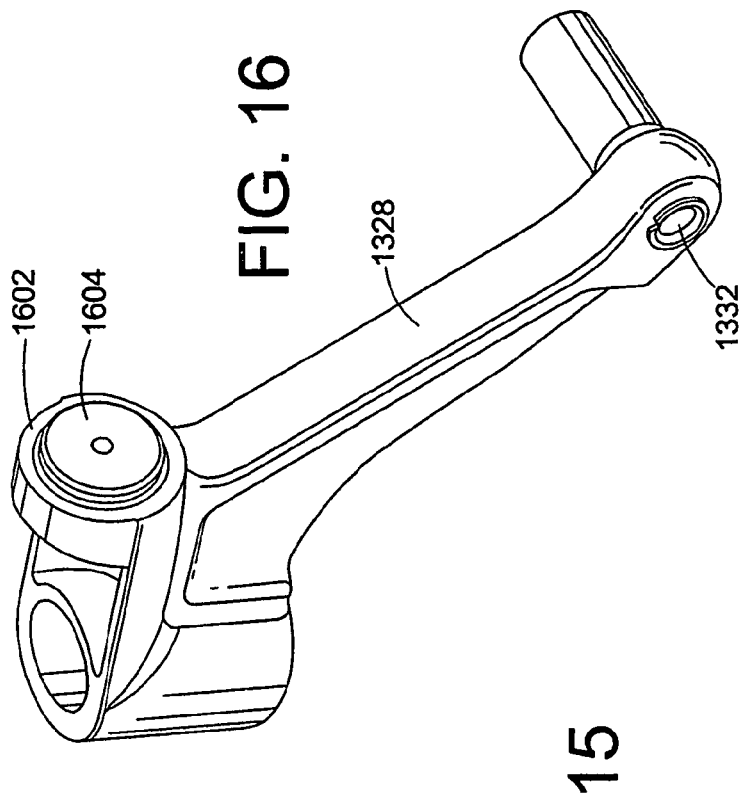
Figure 15:
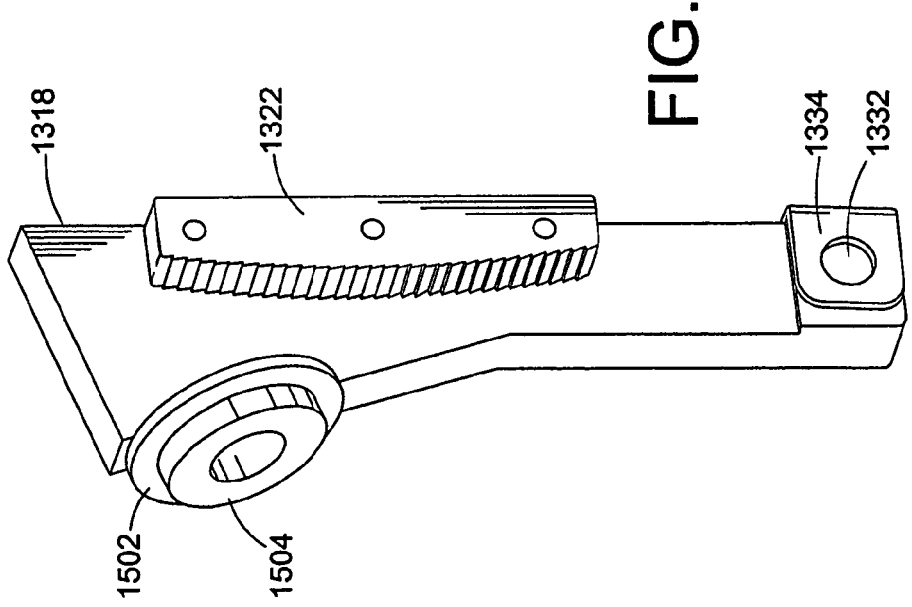

FIGS. 14 through 16, further illustrate the locking assembly and its components in perspective views. In particular, FIG. 15 is a perspective view of the spring mount 1318. Spring mount 1318 further has a surface 1502 for bearing against spring 1326 and a structure 1504 holding spring 1326 in position relative spring mount 1318. FIG. 16 is a perspective view of rear caster mount 1328. Rear caster mount 1328 further has a surface 1602 for bearing against spring 1326 and a structure 1604 for holding spring 1326 in position relative to rear caster mount 1328.

Figure 17A:
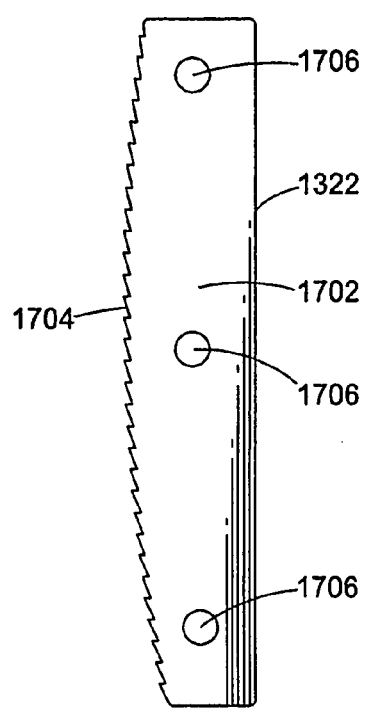
Figure 17B:
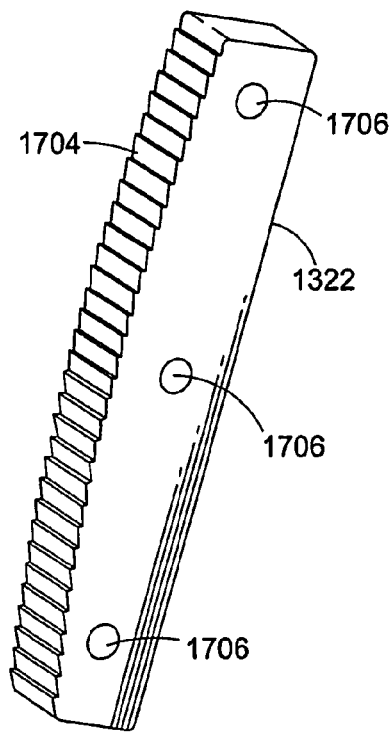

Referring now to FIGS. 17A and 17B, elevational and perspective views, respectively, of the second ratchet 1322 are illustrated. Second ratchet 1322 has a body 1702 that includes a plurality of mounting apertures 1706 that are used to fasten it to spring mount 1318. Body 1702 also includes a toothed surface 1704. The toothed or undulating nature of surface 1704 is configured to provide a plurality of releasable locking states when engaged with first ratchet 1320. The number of releasable locking states can vary from 1 to 2 or more. For example, surface 1704 can have a single tooth any where along its length for engagement with first ratchet 1320. Additionally, surface 1704 can have first and second teeth disposed at the proximal ends of its curved or arcuate length. This configuration provides two locking states that permit a range of tipping motion by the frame, but place limits on the range. In yet another embodiment, surface 1704 can have first and second teeth disposed at the proximal ends of its length and at least one tooth somewhere intermediate the ends. This configuration provides two locking states that permit a range of tipping motion by the frame, but which place limits on the range, and a third discrete locking state intermediate the limits. As further illustrated in FIGS. 17A and 17B, surface 1704 is slightly curved or arcuate to compensate for the nature of the pivotal motion first ratchet 1320 experiences as it pivots with pivot arm linkages 1302 and 1304.

Figure 18A:
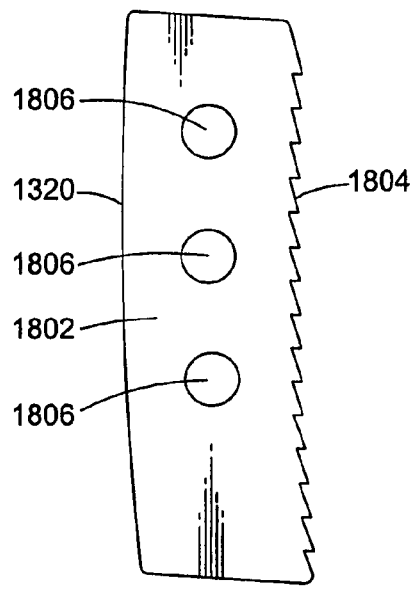
Figure 18B:
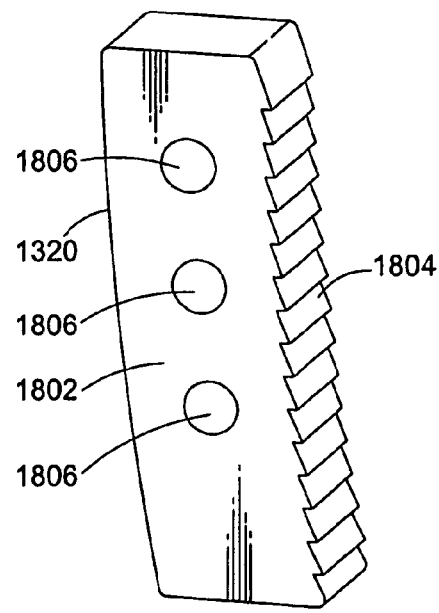

FIGS. 18A and 18B are elevational and perspective views, respectively, of first ratchet 1320. First ratchet 1320 has a body 1804 that includes a plurality of mounting apertures 1806, which are used to fasten first ratchet 1320 to motor rack bracket 1314. Body 1804 also has a toothed surface 1804, which is slightly curved or arcuate to accommodate the pivotal motion experienced by second ratchet 1322. The tooth configuration of surfaces 1804 and 1704 are configured such that relative motion between first and second ratchets 1320 and 1322 is more or less permitted in one direction, but motion in the opposite direction is impeded.

Also, as described above in connection with second ratchet 1322, the toothed or undulating nature of surface 1804 is configured to provide a plurality of releasable locking states when engaged with first ratchet 1320. The number of releasable locking states can vary from 1 to 2 or more. For example, surface 1804 can have a single tooth any where along its length for engagement with second ratchet 1322. Additionally, surface 1804 can have first and second teeth disposed at the proximal ends of its curved or arcuate length. This configuration provides two locking states that permit a range of tipping motion by the frame, but place limits on the range. In yet another embodiment, surface 1804 can have first and second teeth disposed at the proximal ends of its length and at least one tooth somewhere intermediate the ends. This configuration provides two locking states that permit a range of tipping motion by the frame, but which place limits on the range, and a third discrete locking state intermediate the limits.

Some of the exemplary vehicle stabilization systems described above may be modified. For example, one or more locking members may be movably connected to a respective pivot arm or assembly permitting one or both locking members to automatically align with the other locking member as they engage to lock the pivot arms or assemblies to limit further movement of the frame in at least one direction. One or more of such self-aligning locking members may permit solid engagement between locking members during much of the life of the vehicle, even as components of the vehicle wear and/or are deformed over time or as a result of collisions. The self-aligning locking member(s) may optionally be "floating" (e.g., freely movable in at least one direction or orientation) with respect to a respective pivot arm or assembly. The self-aligning locking member(s) may optionally include positional memory such that the relative position of the movable locking member(s) during an engagement with the other locking member with respect to at least one orientation or direction will be maintained after disengagement, but will also permit the movable locking member(s) to self-align in that direction for the next engagement, if necessary. Such a positional memory may be provided by a biasing member (e.g., a spring or a plastic material) operatively connected to bias the locking member against a surface to provide positional memory to the locking member relative to its respective assembly.

For example, referring back to FIGS. 17A-B and 18A-B (and the text and other figures accompanying that embodiment), first ratchet 1320 may be movably connected to motor rack bracket 1314 and/or second ratchet 1322 may be movably connected to spring mount 1318. This may be accomplished, for example, by having any one or more bores used to fasten first ratchet 1320 to motor rack bracket 1314 and/or fasten second ratchet 1322 to spring mount 1318 be formed as slots or formed as bores significantly larger than fasteners passing therethrough. Additionally, or in the alternative, fasteners movably connecting the first ratchet 1320 to the motor rack bracket 1314 and/or fasteners movably connecting the second ratchet 1322 to the spring mount 1318 may be shoulder screws that when mounted permit a gap between the first ratchet 1320 and the motor rack bracket 1314 and/or a gap between the second ratchet 1322 and the spring mount 1318, which permits significant freedom of movement of the first ratchet 1320 and/or second ratchet 1322. The first ratchet 1320 and/or second ratchet 1322 may have positional memory (e.g., provided by a spring or other biasing member) in any one or more directions or orientations and may be "floating" in any one or more directions or orientations, as discussed herein.

As another exemplary modification, one or more pivot arms or assemblies may have an associated link pivotally connected to the frame, operatively connected to at least one pivot arm, and operatively connected to the associated locking member. Such a link may cooperate with the at least one pivot arm to cause the first locking member to engage the second locking member responsive to movement of the frame relative to at least one of the first and second assemblies. The use of such a link may permit a relatively wide spacing between the locking members, e.g., spaced apart by ⅜ of an inch or more (e.g., a half-inch or more) when the vehicle is at rest on a flat, level surface. Such a link may also permit exaggerated movement of the locking members responsive to movement of the at least one pivot arm, e.g., responsive to a specific angular movement of the pivot arm causing a greater angular movement of the link and perhaps other links to move corresponding locking members toward each other, which may permit greater sensitivity.

As yet another example, the geometry of the locking members may be such that one locking member is longer than the other and has a concave locking surface. Any combination of any two or more of these additional features—self-aligning locking members, a link, and/or different geometry—may be combined in a vehicle.

Figure 19:
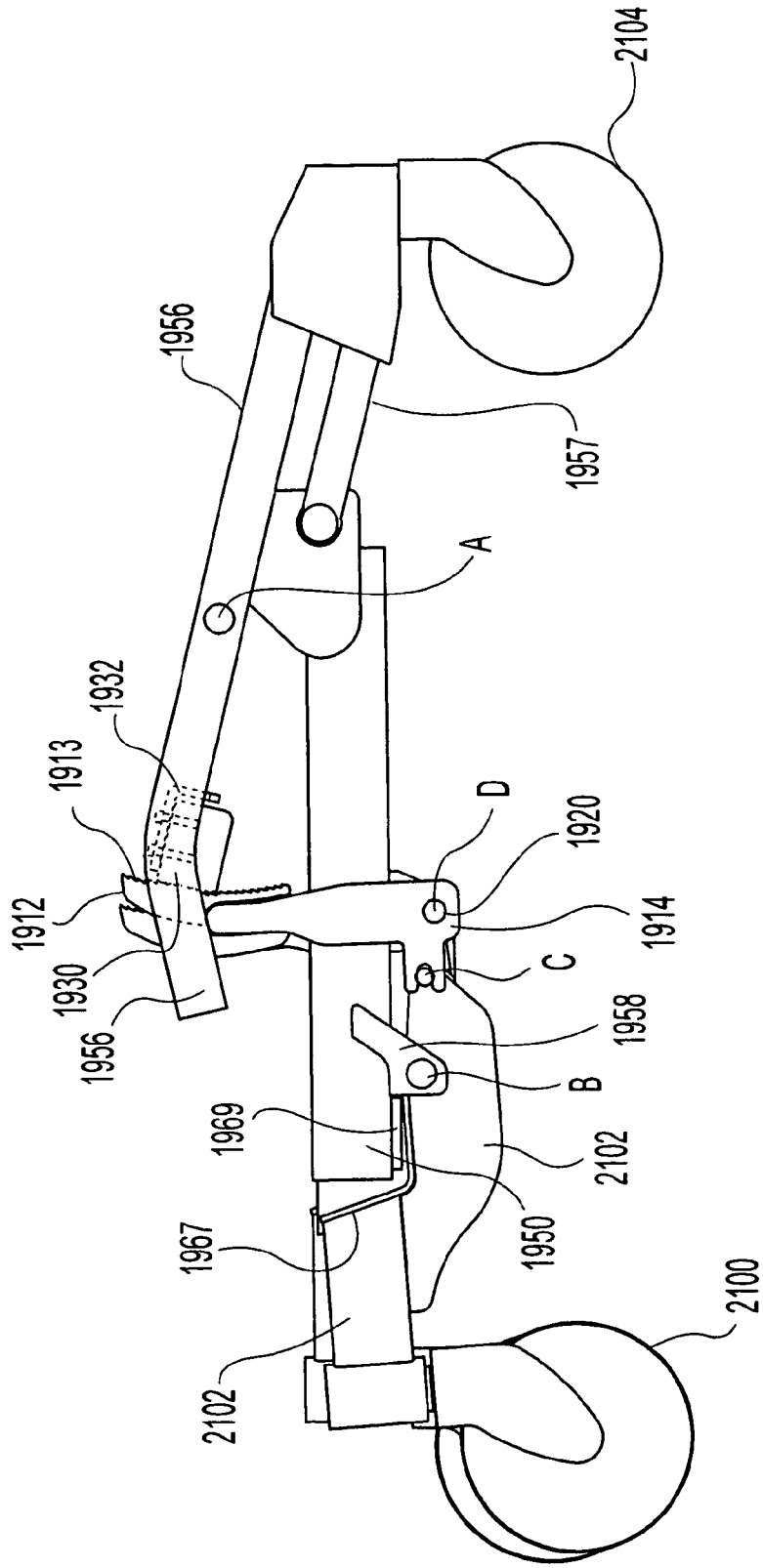
FIG. 19 is a right side elevational view of a portion of a wheeled vehicle with an exemplary stabilization system having a self-aligning locking member.
Figure 20C:
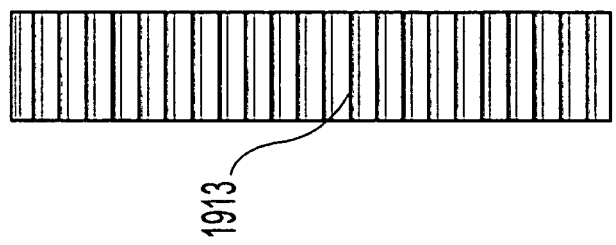
FIGS. 20A-20C and 21A-21C illustrate other locking members.
Figure 20B:
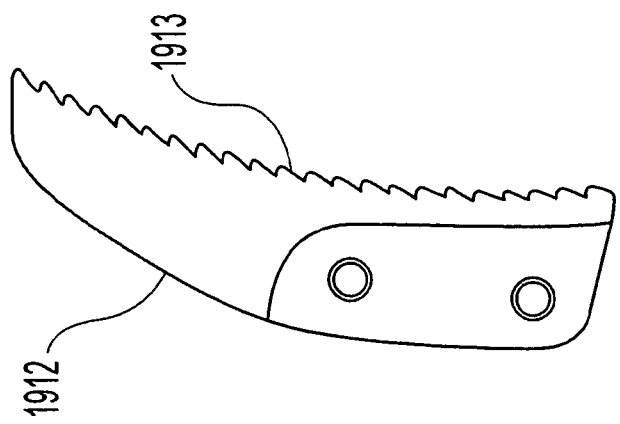
Figure 20A:
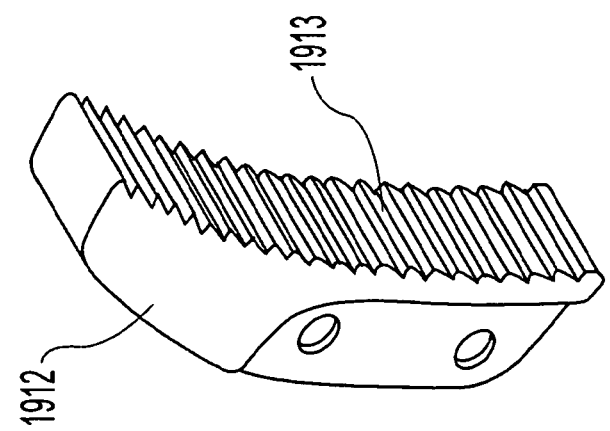
Figure 21C:
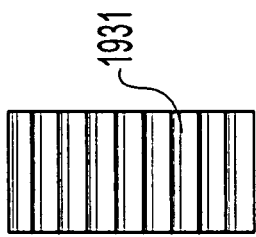
Figure 21B:
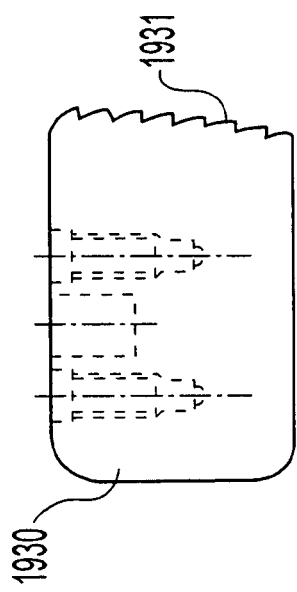
Figure 21A:
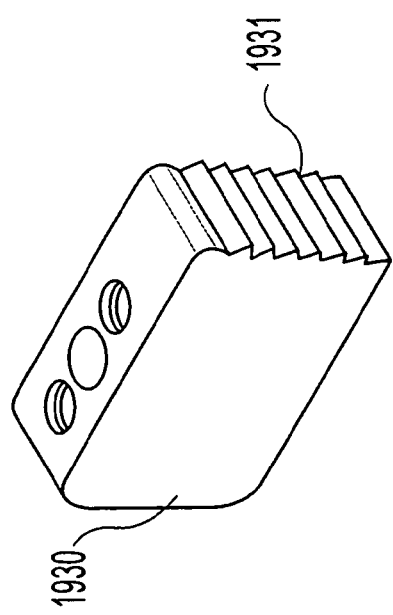

Referring now to FIG. 19, a portion of another exemplary wheeled vehicle is shown as having a stabilization system with a self-aligning locking member, a link, and locking members with different geometry. This exemplary embodiment includes an "anti-dive" stabilization system or "stability lock" that works in combination with the frame of the wheelchair to prevent the chair from tipping over in a forward direction under certain circumstances. Thus, FIG. 19 shows an exemplary suspension 1900 for a wheeled vehicle, comprising a frame 1911, a first assembly 1904 movably connected to the frame 1911, a second assembly 1906 movably connected to the frame 1911, a first locking member 1930 movably connected to the first assembly 1904, and a second locking member 1912 connected to the second assembly 1906. In the exemplary suspension 1900 shown, movement of the frame 1911 relative to the at least one of the first and second assemblies 1904, 1906 causes the first and second locking members 1912, 1930 to engage one another (here, the second locking member 1912 is moved toward the first locking member 1930 so that the first locking member 1930 engages the second locking member 1912) to permit the first and second assemblies 1904, 1906 to cooperate to limit further movement of the frame 1911 in at least one direction. The first locking member 1930 automatically aligns with the second locking member 1912 as the locking members 1912, 1930 engage. FIGS. 20A-20C show various views of locking member 1912, which has a generally concave shape at toothed surface 1913 that engages the other locking member 1930. FIGS. 21A-21C show various views of locking member 1930, which is movably connected to the first assembly 1904. Referring back to FIG. 19, the second assembly 1906 is shown as having an associated link 1914 that is pivotally connected to the frame 1911, operatively connected to pivot arm 2102, and operatively connected to the locking member 1912. Such a link 1914 cooperates with the at least one pivot arm 2102 to cause the locking members 1912, 1930 to engage each other responsive to movement of the frame 1911 relative to at least one of the first and second assemblies 1904, 1906. The suspension of FIG. 19 may be used with an electric wheelchair, such as the Invacare M94 wheelchair or the Invacare TDX wheelchair (Invacare Corporation, Elyria, Ohio), both of which utilize frames that include multiple pivot points.

Figure 22:
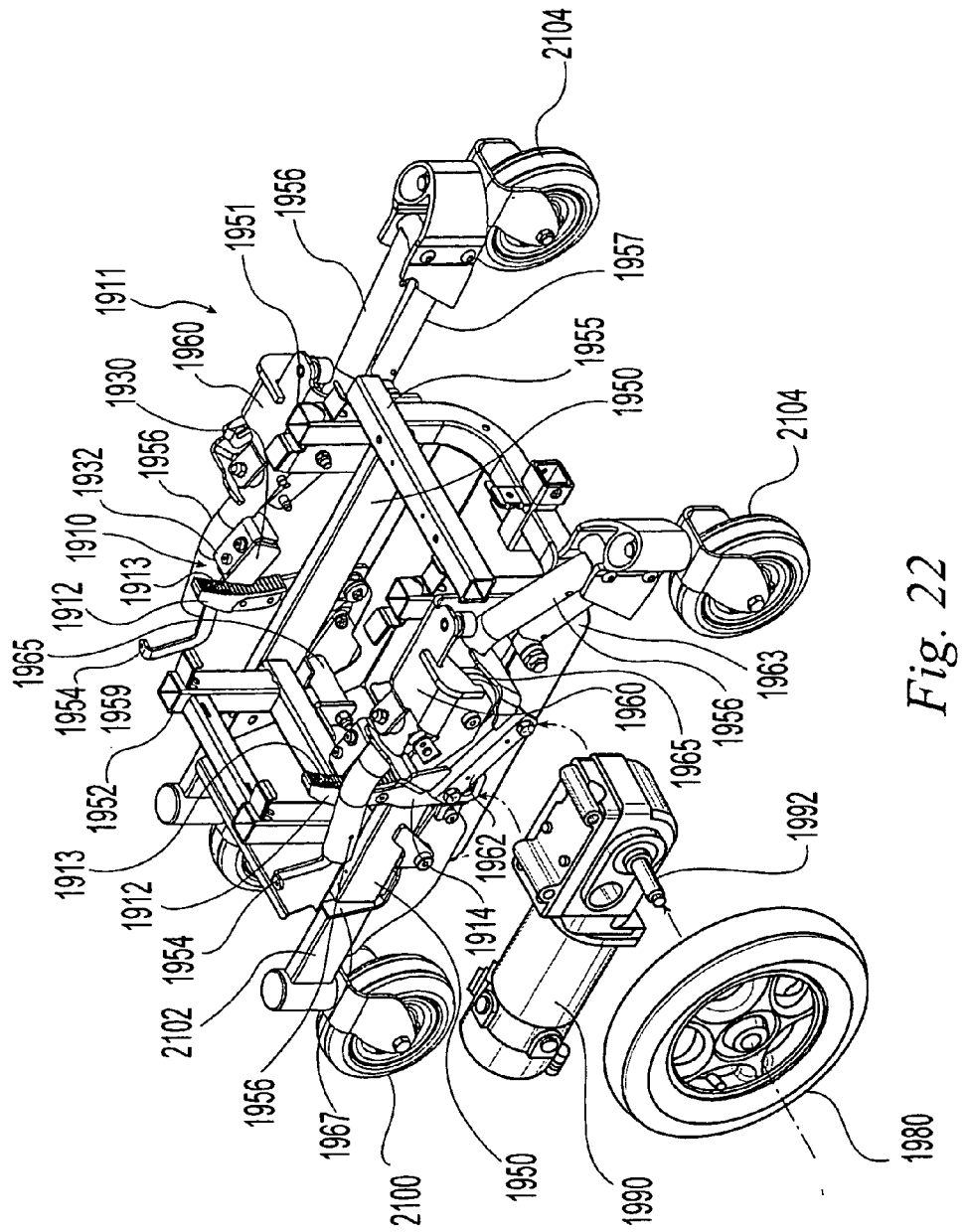
FIGS. 22-28 illustrate another exemplary wheeled vehicle with an exemplary stabilization system having a self-aligning locking member.

Referring now to FIGS. 22-28, various views of a wheelchair base having the suspension of FIG. 19 are shown. As shown in these figures, this embodiment includes a self-aligning "anti-dive" stabilization system 1910. In FIGS. 22-28, the upper portion of the exemplary wheelchair, including the seat and outer shroud, has been removed to better show relevant structural components. FIG. 22 is a semi-exploded, front-right-top isometric view of the exemplary wheelchair base, with a motor, gear box, and drive wheel exploded to show certain relationships between various components.

The exemplary wheelchair base of FIGS. 22-28 comprises a frame 1911. As best shown in FIG. 22, frame 1911 includes left and right side portions 1950, a front portion 1951, a rear portion 1952, shroud mounting brackets 1954, and a front support bracket 1955. First and second assemblies 1904, 1906 (FIG. 19) are pivotally connected to the left and right sides of frame 1911 respectively, and each assembly 1904, 1906 includes an associated surface-engaging portion. As shown in FIGS. 19 and 22-28, the assemblies 1904, 1906 comprise front pivot arms 1956 and rear pivot arms 2102. The front pivot arms 1956 each have an associated front caster 2104 and the rear pivot arms 2102 each have an associated rear caster 2100. The front pivot arms 1956 and the rear pivot arms 2102 are both pivotally connected to frame 1911 to increase overall maneuverability when the wheelchair travels across uneven surfaces or encounters street to curb interfaces or steps. The various attachments or connections described herein may accomplished with appropriate mounting screws, shoulder screws or similar attachment means, or by using other methods and devices known and accepted by those skilled in the art. Certain components are attached to one another by known welding techniques.

As shown in the figures, a swing arm bracket 1960 is used to attach each pivot arm 1956 to frame 1911 at pivot point A. A torsion spring 1965 mounted between pivot arm 1956 and frame 1911 biases the frame to the rear (counterclockwise from the perspective of FIGS. 19 and 23). Each pivot arm 1956 may have an associated stabilization bar 1957 pivotally attached to the frame below and substantially parallel to the pivot arm 1956 to help keep front caster 2104 in a substantially vertical position as the pivot arm 1956 pivots about point A when the wheelchair is in use. This configuration is known as a "four bar linkage." A motor bracket 1962 may be attached to or formed as part of each front pivot arm 1956.

As shown in FIG. 22, an electric motor 1990 may be mounted on motor bracket 1962. A drive wheel 1980 may be mounted on each motor 1990 by attaching the drive wheel 1980 to axle 1992 of the motor or an associated gear box. The motors 1990 are operated by an electronic controller which is connected to one or more user control devices (not shown in the Figures). The user control devices generally provide selection of forward and reverse movement of the vehicle, as well as controlling the vehicle's velocity or speed. A battery 1972 is seated in tray 1963, held in position (kept from sliding from side to side) with battery brackets 1959, and secured with a strap. The battery 1972 typically supplies the various electric components with an energy supply. In the exemplary embodiment shown in the figures, each of the stabilization systems 1910 is installed between a drive wheel 1980 and the portion of base assembly 1911 that supports the electronic components of the wheelchair (see FIG. 27-28) and does not interfere with the placement or operation of other system components such as wire wrap 1970, battery 1972, charger 1974, battery handle 1976 and terminal covers 1977 and 1978. The drive wheels 1980 may be positioned relative to the frame 1911 so that most (e.g., greater than 50%) of the weight of the user of the wheelchair is directly over the drive wheels 1980. Each front pivot arm 1956 may operate independently of the other front pivot arm and each allows its associated front caster 2104 and drive wheel 1980 to move with the pivot arm 1956 as the pivot arm pivots about point A when the wheelchair moves across an uneven surface.

Figure 23:
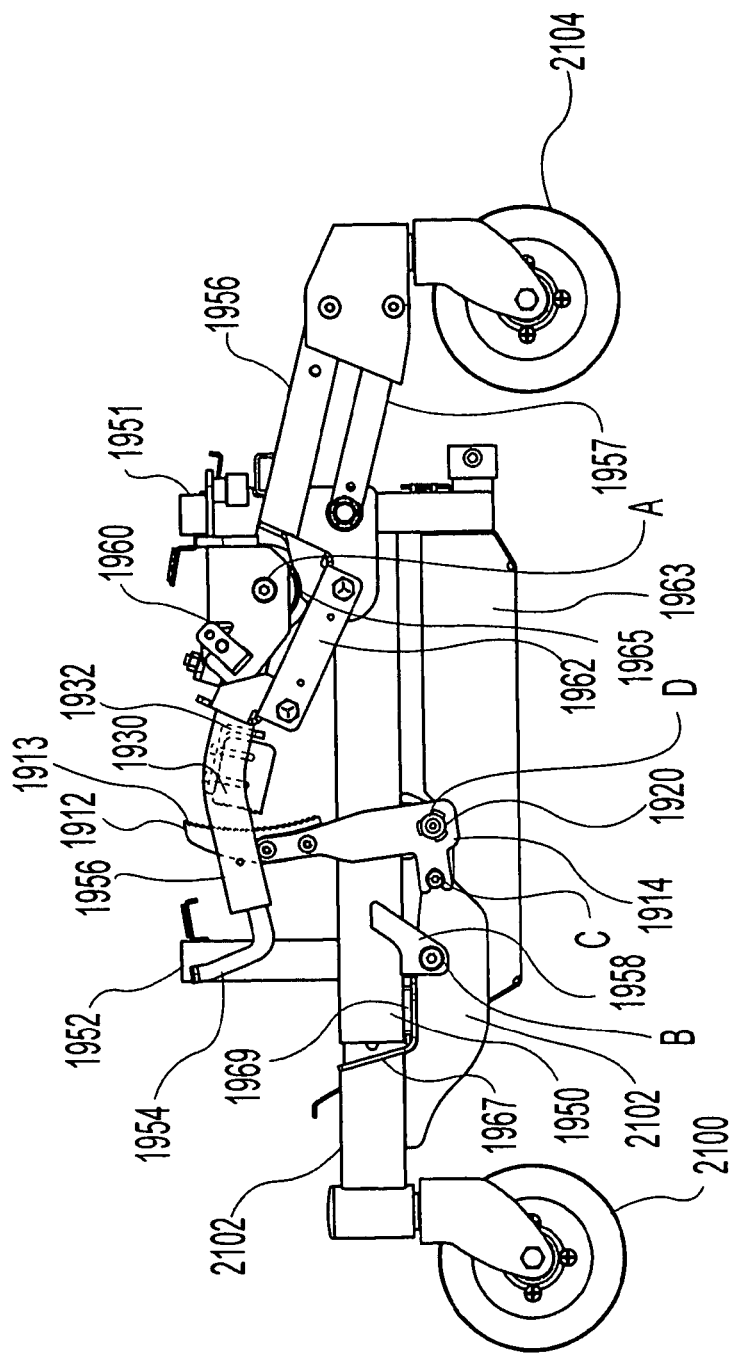
Figure 24:
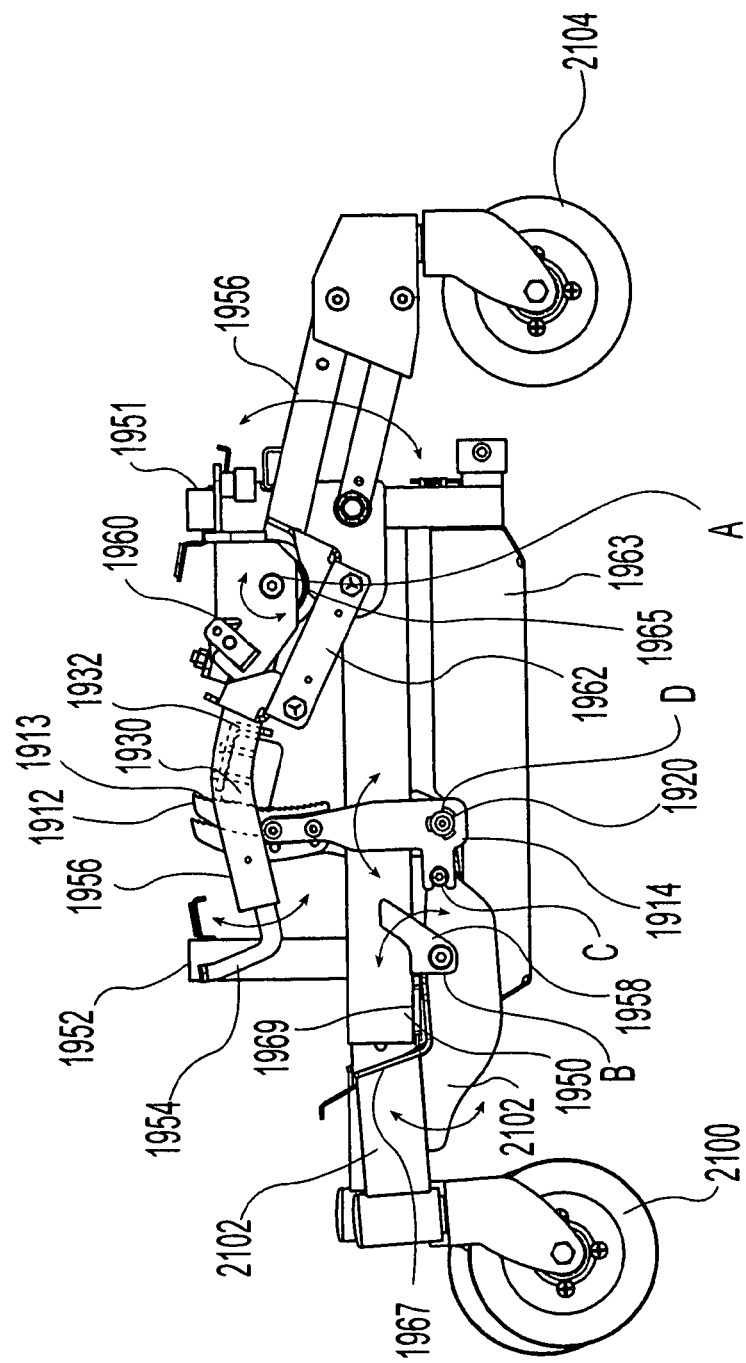

As best shown in FIGS. 19 and 23-24, each rear pivot arm 2102 may be pivotally attached to each side frame portion 1950 at the rear portion of frame 1911. Each rear pivot arm 2102 is operatively connected to a frame-mounted pivot bracket 1958, which allows rear pivot arm 2102 to pivot around pivot point B. A tube 1966 is welded to each rear pivot arm 2102 to confer lateral stability to the arm. If the wheelchair tips forward, each rear pivot arm 2102 will drop (i.e., rotate counterclockwise around pivot point B from the perspective of FIGS. 19 and 23-24) and each rear caster 2100 will drop or move in a downward direction. A stop, e.g., a plastic pad 1969, may be mounted on both sides of the frame between the rear pivot arm 2102 and the frame 1911. Also, as shown in FIG. 19, a reinforcement flange 1967 adds structural stability to the two sections of each rear pivot arm 2102. As with front pivot arms 1956, each rear pivot arm 2102 pivots independently of the other rear pivot arm when the wheelchair moves across an uneven surface.

As best shown in FIGS. 19, 20A-20C, 21A-21C and 25, self-aligning stabilization system 1910 comprises, on each side of the wheelchair, a locking apparatus. Each locking apparatus further includes a pivoting locking member 1912 having a toothed surface 1913 and a floating locking member 1930 having a toothed surface 1931. Toothed surfaces 1913 and 1931 engage one another under certain operating conditions to prevent the wheelchair from tipping over in a forward direction, as discussed in more detail below.

With reference to FIGS. 19 and 20A-20C and 21A-21C, each locking apparatus of stabilization system 1910 includes a pivoting locking member 1912, also referred to as a "pivot rack" connected to or mounted on each side of the outer portion of the frame, and a floating locking member 1930, also referred to as a "motor rack," connected to or mounted on each of the front pivot arms 1956. Each of these locking members includes a substantially solid body manufactured from metal or other suitably rigid and durable material that includes on one of its sides a toothed or ratcheted surface. When properly installed, the toothed surfaces of each locking member face one another and when stabilization system 1910 is in operation, these teeth engage one another or "lock" together to prevent further movement the components to which the locking members are attached.

Figure 25:
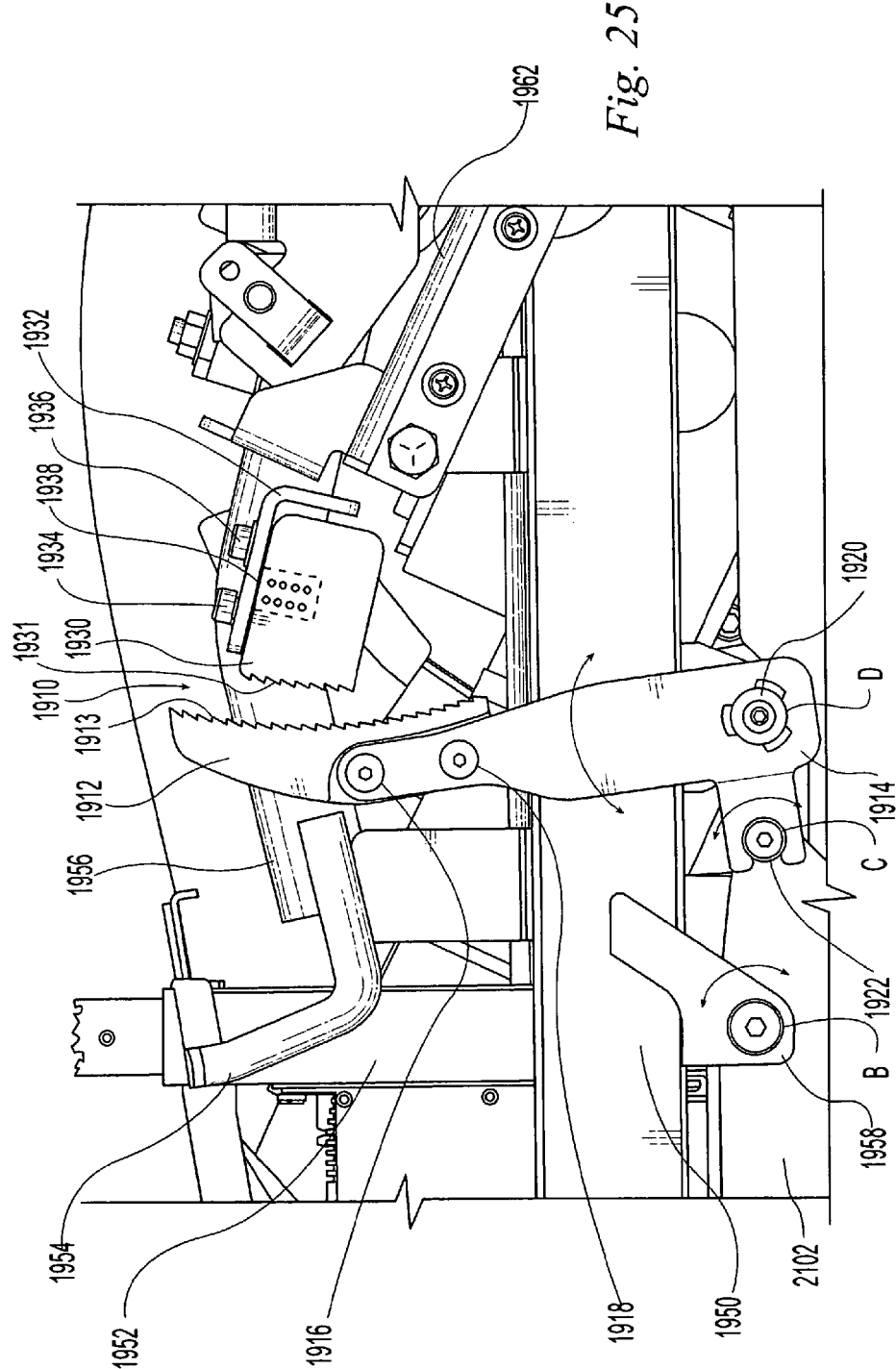

In the exemplary embodiment, each pivot rack 1912 typically includes an elongated piece of metal having slightly curved or arced front and rear edges (see FIG. 21A-C). The toothed edge of pivot rack 1912 is slightly concave and includes the aforementioned ratchets or teeth. The toothed edge 1913 of pivot rack 1912 has a cross-sectional shape substantially like a section of a hypothetical circle, with the radius of the hypothetical circle being approximately the same length as a line segment (not shown) extending from a point (not shown) on pivot point A to a point (not shown) on the toothed surface 1932 of the other locking member 1930. As shown in FIG. 25, pivot rack 1912 is attached to pivoting link 1914 with screws 1916 and 1918. Pivot rack 1912 may be rigidly attached to pivoting link 1914. In the alternative, pivot rack 1912 may be movably attached to pivoting link 1914 to provide additional self-alignment. This may be accomplished, for example, by having any one or more bores used to fasten pivot rack 1912 be formed as slots or formed as bores significantly larger than fasteners passing therethrough. The pivot rack 1912 may have positional memory (e.g., provided by a spring or other biasing member) in any one or more directions or orientations and may be "floating" in any one or more directions or orientations, as discussed herein. Pivoting link 1914 is pivotally attached to the frame 1911 at pivot point D via fastener 1920 and operatively connected to rear pivot arm 2102 at point C via fastener 1922. As indicated by the arrows in FIG. 24, rotation of rear pivot arm 2102 about pivot point B causes pivot link 1914 to pivot about pivot point D, causing pivot rack 1912 to move into or out of contact with motor rack 1930. A rack bracket 1932 is utilized for attaching each motor rack 1930 to each front pivot arm 1956.

Figure 26:
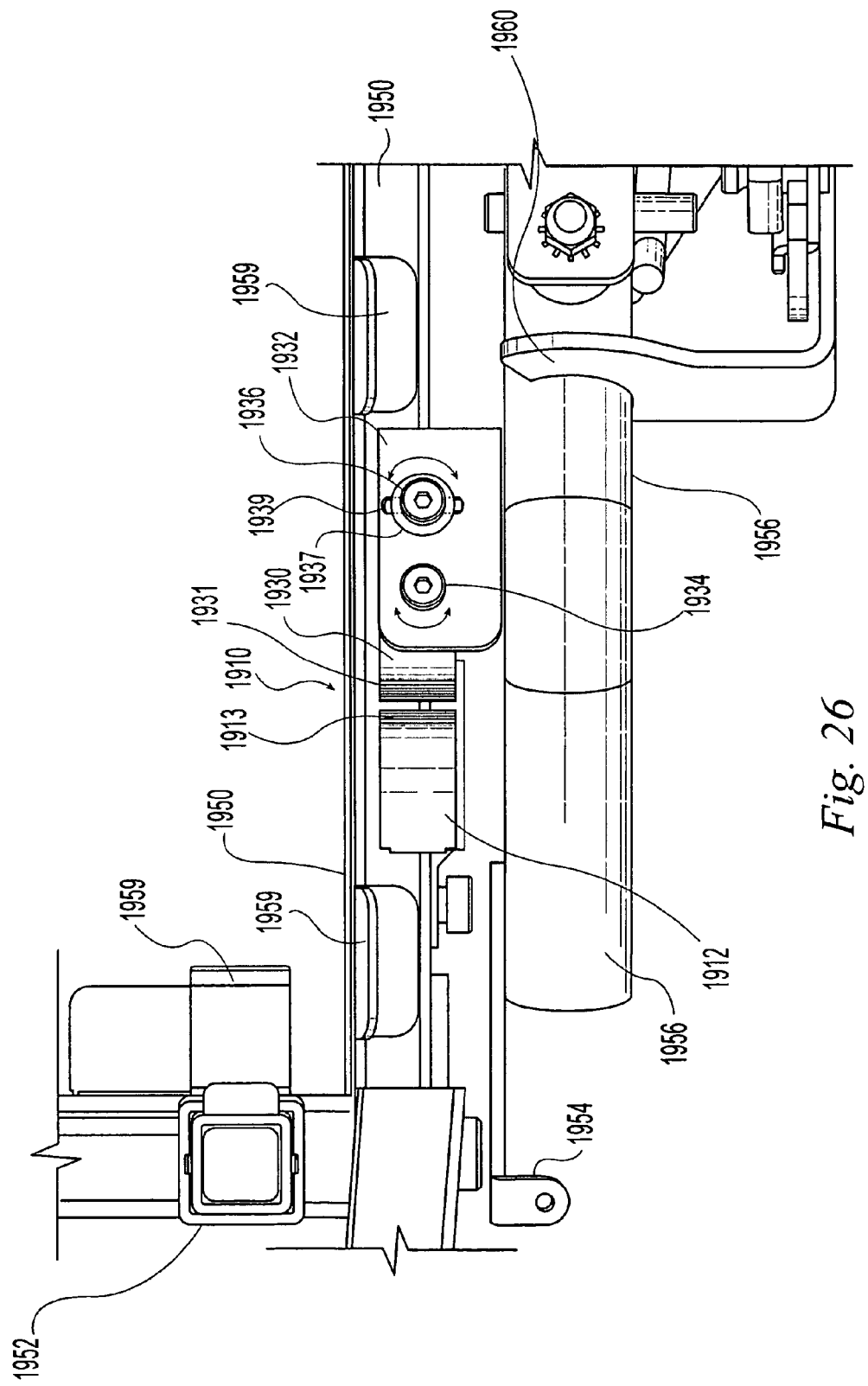
Figure 27:
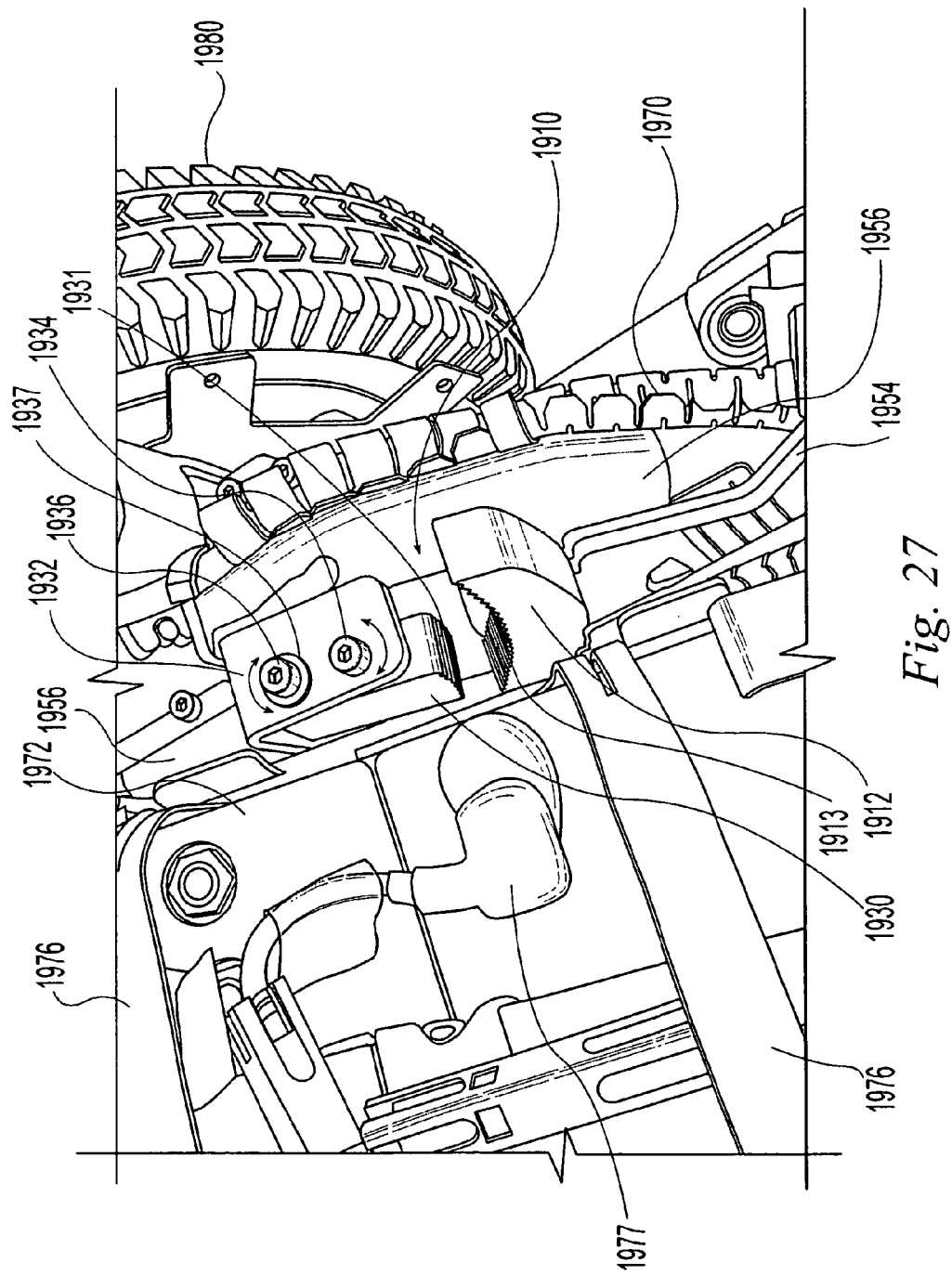
Figure 28:
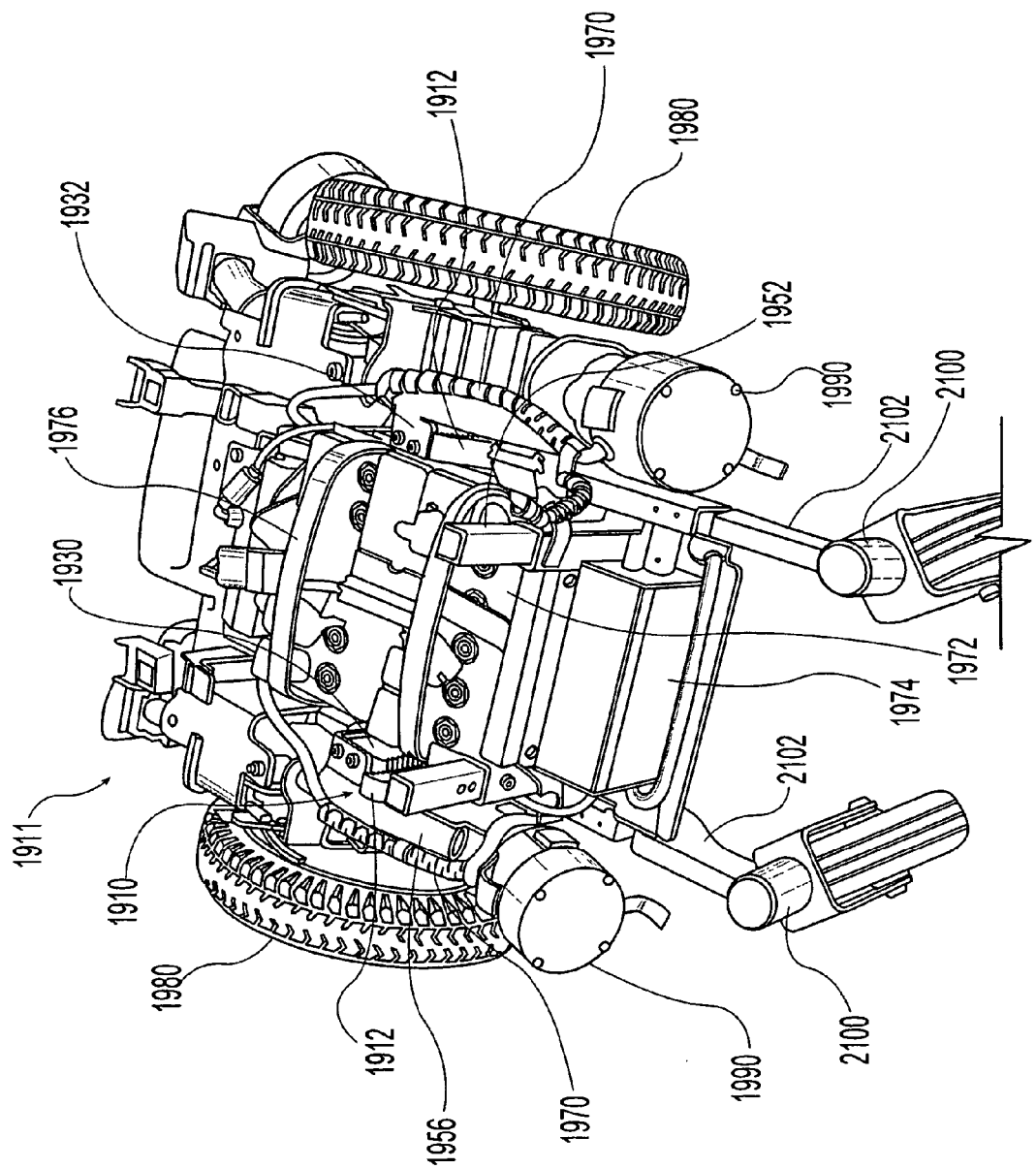

Similar to pivot rack 1912, and as previously described, one side of motor rack 1930 includes a series of ratchets or teeth that engage the teeth on the pivot rack 1912 when both components are properly oriented and stabilization system 1910 is in operation. In the exemplary embodiment, motor rack 1930 is movably attached to rack bracket 1932 by shoulder screws 1934, 1936 fastened through bracket 1932 to threaded bores 2134, 2136 (FIGS. 21A-21B) in motor rack 1930. Shoulder screws 1934, 1936 do not tightly fasten the motor rack 1930 to the bracket 1932; rather, the shoulder screws 1934, 1936 engage corresponding shoulders in corresponding bores 2134, 2136 so that the motor rack 1930 essentially hangs from bracket 1932, leaving a slight gap between the top surface of motor rack 1930 and the bottom surface of rack bracket 1932 (see FIGS. 25A-25B and 27). Thus, the motor rack 1930 is free to move up and down. Additionally, the motor rack can move laterally. More specifically, as shown in FIG. 26, a slot 1939 is formed through rack bracket 1932, with shoulder screw 1936 extending through slot 1939. Slot 1939 provides the motor rack 1930 with the ability to move laterally to some extent (i.e., the ability to rotate back and forth about a pivot point created by shoulder screw 1934). A washer 1937 between shoulder screw 1936 and bracket 1932 provides a larger sliding surface as the motor rack 1930 moves back and forth, and provides a desired angle of the motor rack 1930 relative to the other locking member 1912. Mounting motor rack 1930 to rack bracket 1932 in the described manner allows motor rack 1930 to "float" as it hangs off of the bracket 1932 to which it is mounted. In the exemplary embodiment, a biasing member or compression spring 1938 is mounted between motor rack 1930 and bracket 1932 inside bore 2138 (FIGS. 21A-21B) and confers a degree of positional memory to motor rack 1930. More specifically, spring 1938 biases the motor rack 1930 against a surface of the bracket 1932 so that the relative position of the motor rack 1930 during an engagement with the other locking member 1912 with respect to slot 1939 will be maintained after disengagement, and the motor rack 1930 also remains movably connected to the bracket 1932 permitting the motor rack 1930 to self-align in that slot for the next engagement, if necessary. In the specific embodiment shown, even though the spring 1938 causes the motor rack 1930 to have positional memory with respect to slot 1939, the motor rack 1930 is free to move up (e.g., rotate up) against the spring with each engagement with the other locking member 1912 and move down (e.g., rotate down) with each disengagement with the other locking member 1912 via the freedom of movement provided by shoulder screw 1934. Although motor rack 1930 is shown in the figures as being mounted from its top, motor rack 1930 (and pivot rack 1912) may be mounted in a manner other than as specifically shown. For example, motor rack 1930 may be movably mounted from its side via a bore and a slot and/or a pair of slots.

With specific reference to FIGS. 23-24, pivot rack 1912 and motor rack 1930 are triggered to engage each other whenever rear caster 2100 is lifted from (or about to be lifted from) its supporting surface (i.e., when one or both of the rear casters 2100 are "unloaded"), such as when the wheelchair's user leans significantly forward or perhaps on certain surfaces. That is, motion of the frame 1911 relative to the rear pivot arm 2102 permits the caster-end of the rear pivot arm to drop under the force of gravity. From the perspective of FIGS. 19, 23, and 24, the rear pivot arm 2102 drops (i.e., rotates counterclockwise in those figures) responsive to being unloaded. Right rear pivot arm 2102a in FIG. 19 is shown as having dropped, causing right pivot rack 1912a to move forward to engage right motor rack 1930a. Left rear pivot arm 2102b and left motor pivot rack 1912b are shown in the neutral position in FIG. 19 in which the lock is not engaged. The pivot link 1914 is pivotally connected to the frame at pivot point D and connected to the rear pivot arm at pivot point C. Thus, the relative motion between the frame and the rear pivot arm 2102 as the rear pivot arm is unloaded causes the pivot link 1914 to rotate in an opposite direction about its pivotal connection at pivot point D so that the pivot rack 1912 at the end of pivot link 1914 comes into contact with and engages motor rack 1930. When pivot rack 1912 engages motor rack 1930, the front pivot arm 1956 and rear pivot arm 2102 engage, which prevents any additional motion of the frame 1911 relative to the front pivot arm 1956 in that direction, which will tend to prevent any further tipping in that direction. When the wheelchair frame 1911 moves back in the opposite direction, so that the rear casters are re-loaded and pushed back up, the pivot rack 1912 disengages the motor rack 1930, which permits the front pivot arm 1956 to once again freely pivot about pivot point A. More specifically, motion of the frame 1911 relative to the rear pivot arm 2102 in the opposite direction causes the pivot link 1914 to move in the opposite direction, which causes pivot rack 1912 to disengage from motor rack 1930, which permits the front pivot arm 1956 to freely pivot about pivot point A.

In the exemplary embodiment shown in the figures, there are two independent stabilization systems installed on frame 1911; one on the right side and the other on the left side. Thus, if an uneven surface encountered by the user of the wheelchair causes only one of the rear pivot arms to drop or rotate at pivot point B, the engagement of just one of the stabilization systems will typically be adequate to prevent the chair from tipping over in a forward direction.

The motor rack 1930 is essentially self-aligning with respect to the pivot rack 1912. Such self-alignment is the result of the movable connection between motor rack 1930 and the front pivot arm 1956 via the bracket 1932. In the specific embodiment shown, the motor rack 1930 has freedom of motion in several directions (the motor rack 1930 is capable of a certain degree of lateral rotation and vertical freedom of movement relative to front pivot arm 1956 (and ultimately freedom of movement relatively to pivot rack 1912)). This self-aligning characteristic may help compensate for various factors, such as component wear patterns, user weight, deformations as a result of collisions, and other factors, any one or more of which may cause the pivot rack 1912 and motor rack 1930 to be horizontally offset from nominal alignment and/or non-coplanar and/or vertically offset from nominal alignment. Some overlap between the two racks 1912, 1930 will permit self-alignment of the motor rack 1930 relative to the pivot rack 1912 and perhaps result in sufficient overlap between the two racks 1912, 1930 to help prevent tipping, as discussed above. In the exemplary embodiment, the ratcheted or toothed side of the pivot rack 1912 is significantly longer than that of the motor rack 1930, thereby providing multiple engagement points along its length (see FIG. 25). Thus, the relative vertical alignment of the two components need not be exact for effective engagement of the pivot rack 1912 and the motor rack 1930. Accordingly, precise lengthwise and widthwise alignment is not required for effective engagement or "locking" of these components. Additionally, in the exemplary embodiment shown, the motor rack 1930 and the pivot rack 1912 may be spaced further apart than other embodiments of this invention, e.g., spaced apart by about a half-inch or more.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, pivotal connections can be made of any number of structures including bearing assemblies, pins, nuts and bolts, and frictionless sleeve assemblies. Additionally, springs or shock absorbers can be added between pivoting and non-pivoting components to limit, dampen, or somewhat resist the pivotal motions of these components. Also, a brake-disc locking mechanism could be integrated into pivotal connection 406 that locks pivotal connection 406 from rotation when actuated and freely allows pivotal motion about connection 406 when not actuated. Therefore, the invention, in its broader aspects, is not limited to the specific details, the representative apparatus, and illustrative examples shown and described. Accordingly, departures can be made from such details without departing from the spirit or scope of the applicant's general inventive concept.

What is claimed:

1. A method of stabilizing a wheelchair frame comprising:
   actuating a stabilizing system valve upon relative upward movement of the wheelchair frame with respect to a rear caster; wherein this step comprises:

sensing the pivotal movement of the rear caster relative to the frame;

displacing a control member associated with actuating the valve open or closed upon sensing pivotal movement of the rear caster relative to the frame; and actuating the valve closed when displacing the control member;

wherein actuation of the stabilizing system valve causes a fluid spring to at least partially resist tipping of the frame by at least partially resisting movement of a front caster relative to the frame.

2. The method of claim 1 wherein actuating the stabilizing system valve at least partially resists upward and downward movement of the front caster relative to the frame.

3. The method of claim 1 further comprising allowing downward movement of the front caster with respect to the frame when the stabilizing system valve is actuated.

4. The method of claim 1 wherein actuation of the stabilizing system valve simultaneously resists movement of a first front caster and a second front caster relative to the frame.

5. A method of stabilizing a wheelchair comprising:
sensing the pivotal movement of the rear caster with respect to a wheelchair frame;

displacing a control member associated with actuating a valve open or closed of a piston valve assembly; and actuating the valve closed when displacing the control member to lock the piston valve assembly in place to thereby restrict relative motion between the frame and a front caster.

6. The method of claim 5 wherein displacing a control member comprises actuating a linear displacement member.

7. The method of claim 6 wherein actuating a linear displacement member comprising actuating a push-pull cable.

8. The method of claim 5 wherein displacing a control member comprises moving the control member toward the piston valve assembly.

9. The method of claim 5 wherein displacing a control member comprises moving the control member away from the piston valve assembly.

10. The method of claim 5 wherein displacing a control member comprises translating movement of the rear caster to movement of the control member.

11. The method of claim 10 wherein translating movement of the rear caster to movement of the control member comprises actuating a push-pull cable.

12. The method of claim 5 wherein displacing a control member comprises displacing a reciprocating rod associated with the piston valve assembly.

13. A method of stabilizing a wheelchair comprising:
providing a wheelchair frame, at least one front caster pivotally mounted to the frame, at least one rear caster pivotally mounted to the frame, a piston valve assembly connected to the frame and the front caster; a control assembly connected to the at least one rear caster and the piston valve assembly;

sensing pivotal movement of the at least one rear caster relative to the frame;

actuating the control member based on sensing pivotal movement of the at least one rear caster relative to the frame;

actuating a valve in the piston valve assembly based on actuating the control member to thereby restrict relative movement between the frame and the at least one front caster.

14. The method of claim 13 wherein actuating the control member comprises actuating a linear displacement member.

15. The method of claim 14 wherein actuating a linear displacement member comprising actuating a push-pull cable.

16. The method of claim 13 wherein actuating a control member comprises moving the control member toward the piston valve assembly.

17. The method of claim 13 wherein actuating a control member comprises moving the control member away from the piston valve assembly.

18. The method of claim 13 wherein actuating a control member comprises translating movement of the rear caster to movement of the control member.

19. The method of claim 18 wherein translating movement of the rear caster to movement of the control member comprises actuating a push-pull cable.

20. The method of claim 13 wherein actuating a control member comprises displacing a reciprocating rod associated with the piston valve assembly.

* * * * *